United States Patent
Tapuhi et al.

(10) Patent No.: US 11,025,775 B2
(45) Date of Patent: Jun. 1, 2021

(54) DIALOGUE FLOW OPTIMIZATION AND PERSONALIZATION

(71) Applicant: Genesys Telecommunications Laboratories, Inc., Daly City, CA (US)

(72) Inventors: Tamir Tapuhi, Ramat-Gan (IL); Yochai Konig, San Francisco, CA (US); Amir Lev-Tov, Bat-Yam (IL); Avraham Faizakof, Kfar-Warburg (IL); Yoni Lev, Tel Aviv (IL)

( * ) Notice: Subject to any disclaimer, the term of this patent is extended or adjusted under 35 U.S.C. 154(b) by 0 days.

(21) Appl. No.: 16/567,513

(22) Filed: Sep. 11, 2019

(65) Prior Publication Data

US 2020/0007682 A1 Jan. 2, 2020

Related U.S. Application Data

(62) Division of application No. 14/919,675, filed on Oct. 21, 2015, now Pat. No. 10,455,088.

(51) Int. Cl.
*H04M 11/00* (2006.01)
*H04M 3/493* (2006.01)
(Continued)

(52) U.S. Cl.
CPC ...... *H04M 3/4938* (2013.01); *G06F 16/3329* (2019.01); *H04M 3/5166* (2013.01); *G10L 15/22* (2013.01); *H04M 7/0012* (2013.01)

(58) Field of Classification Search
CPC ............. H04M 3/4938; H04M 3/5166; H04M 7/0012; G06F 16/3329; G10L 15/22
See application file for complete search history.

(56) References Cited

U.S. PATENT DOCUMENTS 6,009,392 A 12/1999 Kanevsky et al.
6,332,154 B2 12/2001 Beck et al.
(Continued)

FOREIGN PATENT DOCUMENTS

JP 20000339314 12/2000
WO 2007118324 A1 10/2007

OTHER PUBLICATIONS

Konig, Y., et al. "GDNN: A Gender-Dependent Neural Network for Continuous Speech Recognition," International Computer Science Institute, Berkeley, CA, Dec. 1991 (8 pages).
(Continued)

*Primary Examiner* — Solomon G Bezuayehu

(57) ABSTRACT

A method for generating a dialogue tree for an automated self-help system of a contact center from a plurality of recorded interactions between customers and agents of the contact center includes: computing, by a processor, a plurality of feature vectors, each feature vector corresponding to one of the recorded interactions; computing, by the processor, similarities between pairs of the feature vectors; grouping, by the processor, similar feature vectors based on the computed similarities into groups of interactions; rating, by the processor, feature vectors within each group of interactions based on one or more criteria, wherein the criteria include at least one of interaction time, success rate, and customer satisfaction; and outputting, by the processor, a dialogue tree in accordance with the rated feature vectors for configuring the automated self-help system.

10 Claims, 18 Drawing Sheets

(51) Int. Cl.
   *H04M 3/51*   (2006.01)
   *G06F 16/332*   (2019.01)
   *G10L 15/22*   (2006.01)
   *H04M 7/00*   (2006.01)

(56) References Cited

U.S. PATENT DOCUMENTS

| | | | |
|---|---|---|---|
| 6,532,444 | B1 | 3/2003 | Weber |
| 7,373,300 | B1 | 5/2008 | Bangalore et al. |
| 7,487,094 | B1 | 2/2009 | Konig et al. |
| 8,345,835 | B1* | 1/2013 | Or-Bach ........... H04M 1/72469 379/88.23 |
| 8,774,392 | B2 | 7/2014 | Odinak et al. |
| 8,903,712 | B1 | 12/2014 | Tremblay et al. |
| 9,571,652 | B1 | 2/2017 | Zeppenfeld et al. |
| 9,817,813 | B2 | 11/2017 | Faizakof et al. |
| 10,061,867 | B2 | 8/2018 | Lev et al. |
| 2001/0049601 | A1 | 12/2001 | Kroeker et al. |
| 2002/0174182 | A1* | 11/2002 | Wilkinson ............ G06Q 10/10 709/205 |
| 2003/0154077 | A1 | 8/2003 | Tahara et al. |
| 2003/0161464 | A1* | 8/2003 | Rodriguez ........... H04M 3/428 379/266.01 |
| 2004/0030552 | A1 | 2/2004 | Omote et al. |
| 2004/0122941 | A1* | 6/2004 | Creamer .............. H04M 3/493 709/224 |
| 2005/0043953 | A1 | 2/2005 | Tiemo et al. |
| 2005/0055399 | A1 | 3/2005 | Savchuk |
| 2006/0178884 | A1 | 8/2006 | Acero et al. |
| 2007/0133759 | A1* | 6/2007 | Malik .................. H04M 3/493 379/80 |
| 2008/0189187 | A1 | 8/2008 | Hao et al. |
| 2009/0094030 | A1 | 4/2009 | White |
| 2010/0049528 | A1* | 2/2010 | Zeinstra .................. G10L 15/00 704/275 |
| 2010/0057463 | A1 | 3/2010 | Weng et al. |
| 2010/0074112 | A1 | 3/2010 | Derr et al. |
| 2010/0162101 | A1 | 6/2010 | Anisimov et al. |
| 2010/0228540 | A1 | 9/2010 | Bennett |
| 2011/0230229 | A1 | 9/2011 | Das |
| 2011/0282662 | A1 | 11/2011 | Aonuma et al. |
| 2012/0016678 | A1* | 1/2012 | Gruber ...................... G06F 9/54 704/275 |
| 2012/0065982 | A1 | 3/2012 | Ativanichayaphong et al. |
| 2013/0185196 | A1* | 7/2013 | Kadur .................. G06Q 20/027 705/39 |
| 2014/0006319 | A1 | 1/2014 | Anand et al. |
| 2014/0028780 | A1 | 1/2014 | Croen |
| 2014/0067375 | A1 | 3/2014 | Wooters |
| 2014/0095596 | A1* | 4/2014 | Singh ................ H04M 3/42102 709/204 |
| 2014/0163968 | A1 | 6/2014 | Ehsani et al. |
| 2014/0188475 | A1 | 7/2014 | Lev-Tov et al. |
| 2014/0200891 | A1 | 7/2014 | Larcheveque et al. |
| 2014/0258503 | A1 | 9/2014 | Tong et al. |
| 2014/0307864 | A1 | 10/2014 | Odinak et al. |
| 2014/0310001 | A1* | 10/2014 | Kalns ....................... G10L 15/32 704/270.1 |
| 2015/0032448 | A1 | 1/2015 | Wasserblat et al. |
| 2015/0032746 | A1 | 1/2015 | Lev Tov et al. |
| 2015/0058006 | A1 | 2/2015 | Proux |
| 2015/0058013 | A1 | 2/2015 | Pakhomov et al. |
| 2015/0142704 | A1* | 5/2015 | London .................. G06N 5/022 706/11 |
| 2015/0178371 | A1 | 6/2015 | Seth et al. |
| 2015/0194149 | A1 | 7/2015 | Faizakof et al. |
| 2015/0195406 | A1 | 7/2015 | Dwyer et al. |
| 2015/0256675 | A1 | 9/2015 | Sri et al. |
| 2015/0310508 | A1 | 10/2015 | Pattekar |
| 2015/0339288 | A1 | 11/2015 | Baker et al. |
| 2015/0339376 | A1 | 11/2015 | Wieweg et al. |
| 2016/0012820 | A1 | 1/2016 | Mun et al. |
| 2017/0018269 | A1 | 1/2017 | Lev Tov et al. |
| 2017/0054848 | A1 | 2/2017 | Meng |

OTHER PUBLICATIONS

Pei, J., et al. "Mining Sequential Patterns by Pattern-Growth: The PrefixSpan Approach," IEEE Transactions on Knowledge and Data Engineering, vol. 16, No. 11, Nov. 2004, pp. 1424-1440.
Guan, Xiaojun, et al., Domain identification by clustering sequence alignments, Glaxo Weilcome Research and Development, 1998, pp. 783-785.
International Search Report and Written Opinion for related Application No. PCT/US2016/057775, dated Feb. 1, 2017, 20 pages.
Ficus, Jon, Sclite scoring package version 1.5, U.S. National Institute of Standard Technology (NIST), Carnegie Mellon University, URL http://www.itl.nist.gov/iad/mig/tools/, 1998, 6 pages.
International Search Report and Written Opinion for related Application No. PCT/US2016/014626, dated Sep. 12, 2016, 20 pages.
Rosenfeld, Roni, Two Decades of Statistical Language Modeling: Where do we Go from Here? Proceedings of the IEEE, vol. 88, 2000, 12 pages.
Extended European Search Report for Application No. 16858164.3, dated Jul. 3, 2018, 10 pages.
European Partial Supplementary Search Report for Application No. 16824960.5, dated Sep. 17, 2018, 14 pages.
Australian Government Examination Report No. 1 for Application No. 2016291566, dated Dec. 11, 2018, 4 pages.
Canadian Office Action for Application No. 2,995,577, dated Dec. 21, 2018, 3 pages.
Canadian Office Action for Application No. 3,005,324, dated Mar. 11, 2019, 4 pages.
Extended European Search Report for Application No. 16824960.5, dated Jan. 16, 2019, 14 pages.
Australian Government Examination Report No. 1 for Application No. 2016341280, dated Jul. 3, 2019, 5 pages.
EP Examination Report for co-pending application No. 16858164.3 dated Apr. 7, 2020.
AU Examination Report for co-pending application No. 2016341280 dated May 27, 2020.
Examiner's Report and Examination Search Report for co-pending Canadian Patent Application No. 3005324 dated Feb. 25, 2020.

* cited by examiner

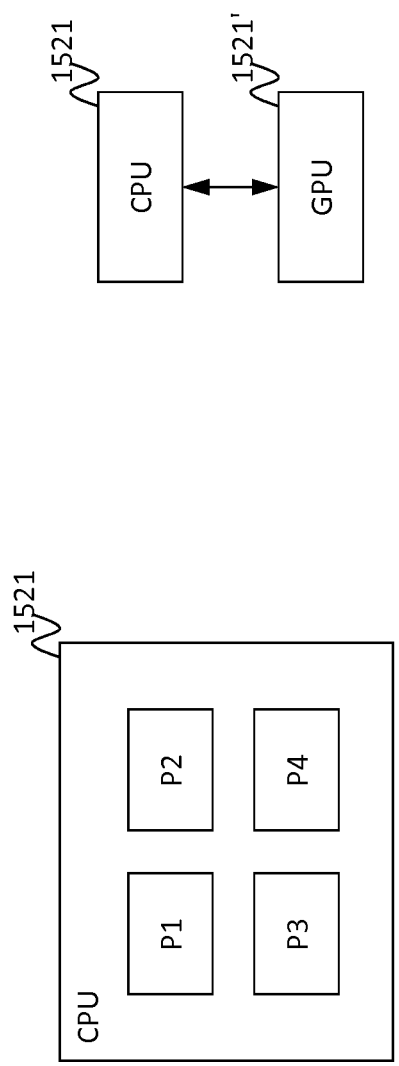

DIALOGUE FLOW OPTIMIZATION AND PERSONALIZATION

CROSS REFERENCE TO RELATED APPLICATION

This application claims the benefit of U.S. patent application Ser. No. 14/919,675, titled "DIALOGUE FLOW OPTIMIZATION AND PERSONALIZATION", filed in the U.S. Patent and Trademark Office on Oct. 21, 2015, and this application is also related to U.S. Pat. No. 10,382,623, titled "DATA-DRIVEN DIALOGUE ENABLED SELF-HELP SYSTEMS", issued Aug. 13, 2019, the contents of which are incorporated herein by reference.

FIELD

Embodiments of the present invention relate to the field of software for operating contact centers, in particular, software and services for assisting people communicating with contact centers and methods for the automated and assisted configuration of such software and services.

BACKGROUND

Contact centers staffed by agents generally serve as an interface between an organization such as a company and outside entities such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls), video (e.g., video conferencing), text (e.g., emails and text chat), or through other media.

At some contact centers, self-help systems may be configured to handle requests and questions from outside entities, without the involvement of a human agent at the contact center, thereby potentially reducing costs for the contact center. For example, self-help systems may suggest solutions to commonly experienced problems. Examples of self-help systems include the Nuance® Nina® and Genesys® Voice Platform (GVP) systems. Self-help systems may be implemented as interactive voice response (IVR) or interactive media response (IMR) systems having speech input capabilities (e.g., in addition to or instead of responding to dual-tone multi-frequency signals from keypresses).

Generally, self-help systems are customized on a per-organization basis in order to provide information and services that are relevant to the organization and the outside entities that the organization interacts with. For example, a wireless telephone carrier may configure a self-help system to automatically provide instructions for solving problems with cellular connectivity or email access, provide information regarding the customer's current bill, or accept payment information.

SUMMARY

Aspects of embodiments of the present invention are directed to systems and methods for assisting in the configuration and customization of a self-help system for a contact center.

According to one embodiment of the present invention, a method for generating a dialogue tree for an automated self-help system of a contact center from a plurality of recorded interactions between customers and agents of the contact center includes: computing, by a processor, a plurality of feature vectors, each feature vector corresponding to one of the recorded interactions; computing, by the processor, similarities between pairs of the feature vectors; grouping, by the processor, similar feature vectors based on the computed similarities into groups of interactions; rating, by the processor, feature vectors within each group of interactions based on one or more criteria, wherein the criteria include at least one of interaction time, success rate, and customer satisfaction; and outputting, by the processor, a dialogue tree in accordance with the rated feature vectors for configuring the automated self-help system.

The computing the similarity between a first feature vector and a second feature vector of the pair of feature vectors may include: summing the number of clusters appearing in both the first feature vector and the second feature vector to initialize a similarity metric; adjusting the similarity metric based on clusters appearing in only one of the pair of feature vectors; and normalizing the similarity metric.

The method may further include computing the success rate by: recognizing, by a processor, speech in the recorded interactions of the group of interactions to generate recognized text, the recognized text including a plurality of phrases, the phrases being classified into a plurality of clusters; identifying, by the processor, clusters corresponding to phrases indicating successful resolution of an issue associated with the interaction; and computing, by the processor, the success rate based on the number of the recorded interactions that include clusters indicating successful resolution of the issue.

The method may further include computing the customer satisfaction rate by: associating each interaction with ratings from a survey; and computing the customer satisfaction based on the ratings.

The method may further include identifying a plurality of customer features associated with the customer associated with each of the recorded interactions.

The method may further include: partitioning the plurality of recorded interactions based on a plurality of groups of personalization features; computing a dialogue tree for each of the groups of personalization features to compute a plurality of dialogue trees; and outputting the plurality of dialogue trees for configuring the automated self-help system.

The dialogue tree may include a plurality of agent nodes arranged in a plurality of agent layers and a plurality of customer nodes arranged in a plurality of customer layers, wherein at least one of the customer nodes is coupled to a plurality of successive agent nodes, and wherein each of the edges between the at least one of the customer nodes and the successive agent nodes includes a condition corresponding to a group of personalization features.

The method may further include outputting a plurality of suggestions for a successive node of a tree based on an input prior node and the rated feature vectors.

According to one embodiment of the present invention, a method for operating an automated self-help system of a contact center, the automated self-help system including at least one dialogue tree, includes: establishing, by a processor, an interaction between a customer and the automated self-help system; identifying, by the processor, a plurality of customer features of the customer; and controlling the automated self-help system in accordance with the customer features and the at least one dialogue tree.

The at least one dialogue tree may include a plurality of dialogue trees, each of the dialogue trees being associated with a group of personalization features, and the controlling the automated self-help system in accordance with the customer features may further include identifying a dialogue tree of the dialogue trees associated with the group of personalization features corresponding to the customer features.

The at least one dialogue tree may include a plurality of agent nodes arranged in a plurality of agent layers and a plurality of customer nodes arranged in a plurality of customer layers, wherein at least one of the customer nodes is coupled to a plurality of successive agent nodes, wherein each edge of the edges between the at least one of the customer nodes and the successive agent nodes includes a condition corresponding to a group of personalization features, and wherein the controlling the automated self-help system in accordance with the customer features may further include identifying an edge of the edges wherein the group of personalization features associated with the edge corresponds to the customer features.

According to one embodiment of the present invention, a system includes: a processor; and a memory, wherein the memory stores instructions that, when executed by the processor, cause the processor to: compute a plurality of feature vectors, each feature vector corresponding to one of a plurality of recorded interactions between customers and agents of a contact center; compute similarities between pairs of the feature vectors; group similar feature vectors based on the computed similarities into groups of interactions; rate feature vectors within each group of interactions based on one or more criteria, wherein the criteria include at least one of interaction time, success rate, and customer satisfaction; and output a dialogue tree in accordance with the rated feature vectors for configuring an automated self-help system.

The instructions that cause the processor to compute the similarity between a first feature vector and a second feature vector of the pair of feature vectors may include instructions that, when executed by the processor, cause the processor to: sum the number of clusters appearing in both the first feature vector and the second feature vector to initialize a similarity metric; adjust the similarity metric based on clusters appearing in only one of the pair of feature vectors; and normalize the similarity metric.

The instructions that cause the processor to compute the success rate may include instructions that, when executed by the processor, cause the processor to: recognize speech in the recorded interactions of the group of interactions to generate recognized text, the recognized text including a plurality of phrases, the phrases being classified into a plurality of clusters; identify clusters corresponding to phrases indicating successful resolution of an issue associated with the interaction; and compute the success rate based on the number of the recorded interactions that include clusters indicating successful resolution of the issue.

The instructions that cause the processor to compute the customer satisfaction rate may include instructions that, when executed by the processor, cause the processor to: associate each interaction with ratings from a survey; and compute the customer satisfaction based on the ratings.

The memory may further store instructions that, when executed by the processor, cause the processor to identify a plurality of customer features associated with the customer associated with each of the recorded interactions.

The memory may further store instructions that, when executed by the processor, cause the processor to: partition the plurality of recorded interactions based on a plurality of groups of personalization features; compute a dialogue tree for each of the groups of personalization features to compute a plurality of dialogue trees; and output the plurality of dialogue trees for configuring the automated self-help system.

The dialogue tree may include a plurality of agent nodes arranged in a plurality of agent layers and a plurality of customer nodes arranged in a plurality of customer layers, wherein at least one of the customer nodes is coupled to a plurality of successive agent nodes, and wherein each of the edges between the at least one of the customer nodes and the successive agent nodes includes a condition corresponding to a group of personalization features.

The memory may further store instructions that, when executed by the processor, cause the processor to output a plurality of suggestions for a successive node of a tree based on an input prior node and the rated feature vectors.

According to one embodiment of the present invention, a system includes: a processor; and a memory, wherein the memory stores instructions that, when executed by the processor, cause the processor to: establish an interaction between a customer and an automated self-help system of a contact center, the automated self-help system including at least one dialogue tree; identify a plurality of customer features of the customer; and control the automated self-help system in accordance with the customer features and the at least one dialogue tree.

The at least one dialogue tree may include a plurality of dialogue trees, each of the dialogue trees being associated with a group of personalization features, and wherein the instructions that cause the processor to control the automated self-help system in accordance with the customer features may include instructions that, when executed by the processor, cause the processor to identify a dialogue tree of the dialogue trees associated with the group of personalization features corresponding to the customer features.

The at least one dialogue tree may include a plurality of agent nodes arranged in a plurality of agent layers and a plurality of customer nodes arranged in a plurality of customer layers, at least one of the customer nodes may be coupled to a plurality of successive agent nodes, each edge of the edges between the at least one of the customer nodes and the successive agent nodes may include a condition corresponding to a group of personalization features, and the instructions that cause the processor to control the automated self-help system in accordance with the customer features may include instructions that, when executed by the processor, cause the processor to identify an edge of the edges wherein the group of personalization features associated with the edge corresponds to the customer features.

BRIEF DESCRIPTION OF THE DRAWINGS

The accompanying drawings, together with the specification, illustrate exemplary embodiments of the present invention, and, together with the description, serve to explain the principles of the present invention.

FIG. 13C is a block diagram of a computing device according to an embodiment of the present invention.

FIG. 13D is a block diagram of a computing device according to an embodiment of the present invention.

DETAILED DESCRIPTION

Figure 1:
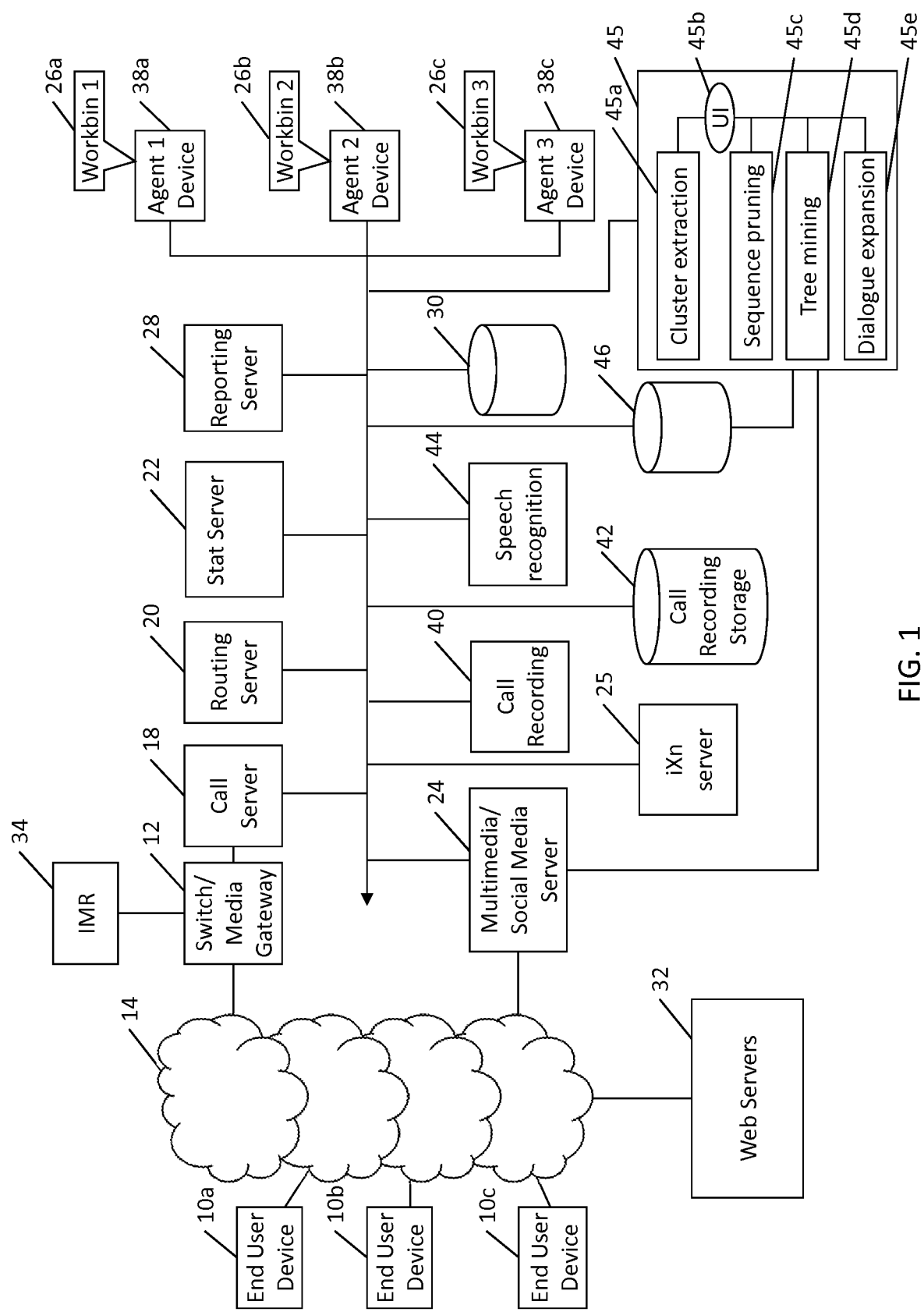
FIG. 1 is a schematic block diagram of a system for supporting a contact center in providing contact center services according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Speech enabled self-help systems may provide benefits in terms of a reduced need for human agents to serve the needs of outside entities interacting with a contact center. For the sake of convenience, outside entities interacting with the contact center will be referred to herein as "customers," and may include situations where the outside entities are not engaged in commercial or business interactions with the contact center. These self-help systems are generally customized to the particular needs of the organizations supported by the self-help systems. Tools for performing this configuration enable the definition of Voice-XML (extensible markup language) and associated XML form grammar (GRXML) for configuring the self-service systems. However, setting, initializing, optimizing, and updating such systems is typically a manual process that is time consuming, expensive, and inefficient. In addition, a designer may fail to appreciate the variety of ways that customers may think about the problem to be solved as they approach the self-help system, such as the most comfortable order in which to provide information (or providing the flexibility for a customer to provide information in an order different from that designed by the system designer).

Systems and methods for assisting in the development of Voice-XML and GRXML based grammars by learning from customer-agent calls can be found, for example, in U.S. patent application Ser. No. 14/799,369 "DATA DRIVEN SPEECH ENABLED SELF-HELP SYSTEMS AND METHODS OF OPERATING THEREOF," the entire disclosure of which is incorporated herein by reference. These learned grammars may be used as building blocks by self-help system configuration tools in order to assist a user (e.g., a human system administrator or system designer or application designer) in configuring the self-help systems. These systems may also automatically perform semantic expansion of phrases submitted by an administrator for detection by the self-help system, thereby allowing for faster and more thorough configuration of a self-help system.

In addition to customizing the Voice-XML and GRXML based grammars detected by the self-help system, a system administrator may also need to design the order in which dialogue options are presented to customers interacting with the self-help system. For example, a self-help system for booking a flight may first ask for a departure city, then a destination city, followed by a travel date. The various questions and answers may be modeled as a directed graph (e.g., a tree), where various nodes of the graph correspond to various states of the self-help system and/or grammars detected by the self-help system. In conventional systems, the paths through the self-help system and the order in which the dialogue options are presented are manually designed by the system administrator based on his or her knowledge of the requirements of the system.

Embodiments of the present invention are directed to systems and methods for assisting a system administrator in designing a dialogue tree. This assistance may be generated by automatically analyzing the previous interactions (e.g., recorded conversations) between customers and human agents and the results of those interactions, thereby solving the problem of designing an automated self-help system that matches actual customer behavior.

Contact Center Overview

FIG. 1 is a schematic block diagram of a system for supporting a contact center in providing contact center services according to one exemplary embodiment of the invention. For the purposes of the discussion herein, interactions between customers using end user devices 10 and agents at a contact center using agent devices 38 may be recorded by call recording module 40 and stored in call recording storage 42. The recorded calls may be processed by speech recognition module 44 to generate recognized text which is stored in recognized text storage 46. In some embodiments of the present invention, an automated self-help system according to embodiments of the present invention is provided by automated self-help configuration module 45, which includes a cluster extraction module 45a, a user interface module 45b, a sequence pruning module 45c, a tree mining module 45d, and a dialogue expansion module 45e, and which will be described in more detail below.

The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one exemplary embodiment, the contact center includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call server 18 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other CC components and/or CC iXn controller 18 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How may I assist you?" and the customer may speak or otherwise enter a reason for contacting the contact center. The customer's speech may then be processed by the speech recognition module 44 and the customer's response may then be used by the routing server 20 to route the call to an appropriate contact center resource.

In more detail, a speech driven IMR receives audio containing speech from a user. The speech is then processed to find phrases and the phrases are matched with one or more speech recognition grammars to identify an action to take in response to the user's speech. As used herein, the term "phrases" may also include "fragments" in which words are extracted from utterances that are not necessarily sequential. As such, the term "phrase" includes portions or fragments of transcribed utterances that omit some words (e.g., repeated words and words with low saliency such as "um" and "ah"). For example, if a user says "what is my account balance?" then the speech driven IMR may attempt to match phrases detected in the audio (e.g., the phrase "account balance") with existing grammars associated with actions such as account balance, recent transactions, making payments, transferring funds, and connecting to a human customer service agent. Each grammar may encode a variety of ways in which customers may request a particular action. For example, an account balance request may match phrases such as "account balance," "account status," "how much money is in my accounts," and "what is my balance." Once a match between the spoken phrase from the user and a grammar is detected, the action associated with the grammar is performed in a manner similar to the receiving a user selection of an action through a keypress. These actions may include, for example, a VoiceXML response that is dynamically generated based on the user's request and based on stored business information (e.g., account balances and transaction records).

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Some embodiments of the present invention are described in the context of a contact center. However, embodiments of the present invention are not limited thereto and may also be used in under other conditions involving configuration of the detection of commands in a speech driven user interface.

Generally, an interaction between a customer and a contact center includes a customer side and a human agent side. As noted above, an interactive media response (IMR) system 34 may be used to provide a speech enabled self-help system to attempt to replace the human agent in the interaction.

When a customer calls a contact center and interacts with the IMR 34, the customer (or caller) may progress along a route through the dialogue tree based on the customer's responses until the customer's issue is resolved or until the customer is transferred to a human agent. The routes through dialogue tree may alternate between automated agent speech played to the customer and grammars for recognizing customer speech (e.g., GRXML). The customer may be routed along different paths of the dialogue tree based on the spoken phrase.

Figure 2:
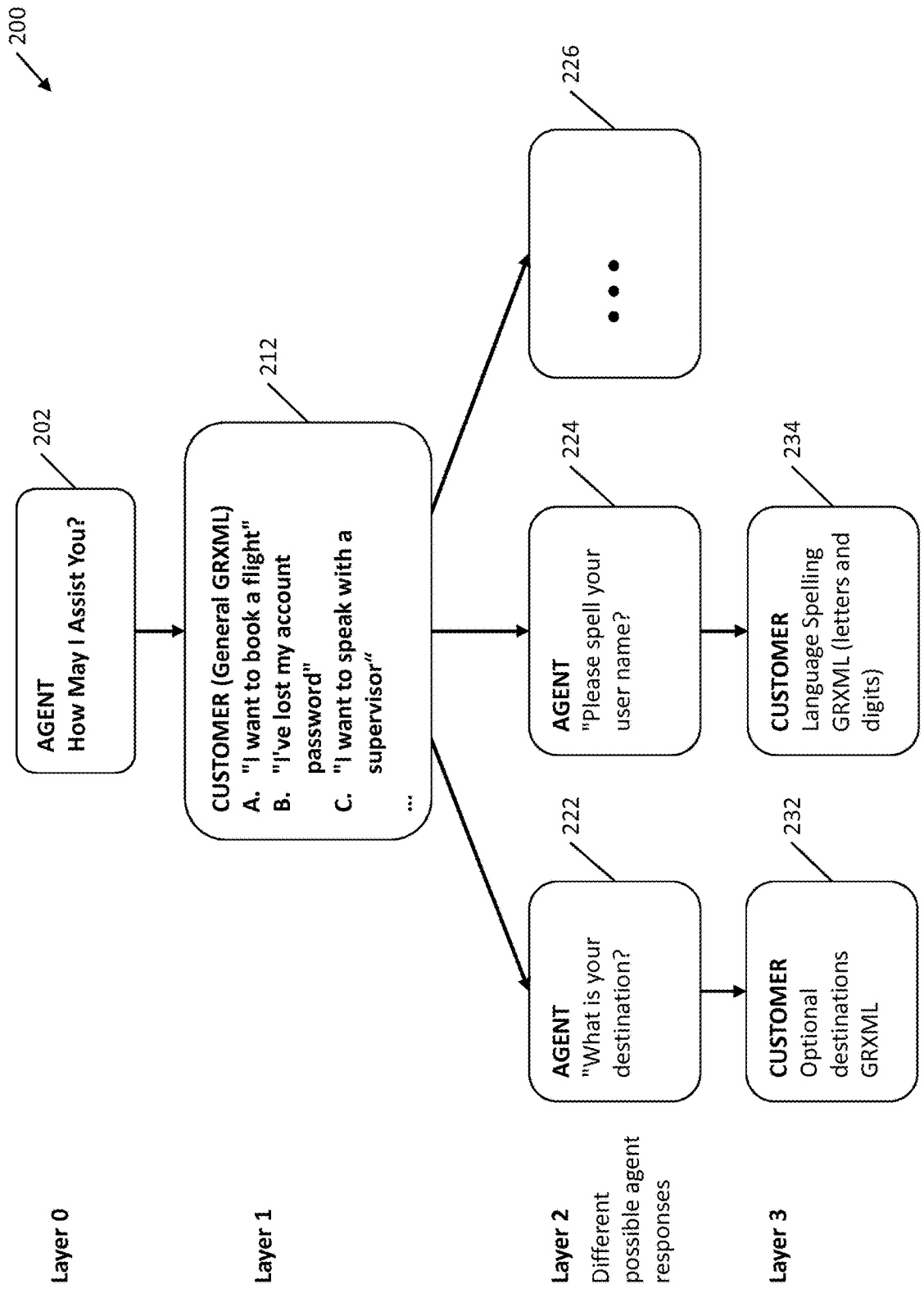
FIG. 2 is an abstract visualization of an exemplary dialogue graph or dialogue tree.

FIG. 2 is an abstract visualization of an exemplary dialogue graph or dialogue tree. The various nodes of the tree correspond to outputs from the IMR 34 (e.g., messages conveyed from the IMR 34 to the customer) or inputs received from the customer (e.g., the customer's responses to the IMR's prompts). The various nodes may be grouped into "layers," where the layers are numbered based on distance from the root of the tree.

The dialogue tree in FIG. 2 may correspond to a portion of a customer self-help system for an airline company. Referring to FIG. 2, in Layer 0 (e.g., the root node 202 of the tree), in response to the customer's establishing a connection to the self-help system (e.g., by dialing the phone number of the contact center) the automated agent may ask the customer "How may I assist you?" This may be provided, for example, by one or more of prerecorded phrases, text-to-speech techniques, transmitting the text to the user (e.g., through a chat interface), or other appropriate techniques for interacting with a customer.

In response to the agent's question, the customer (or caller) may respond with any of a number of potential grammars. The customer's response is processed by the node 212 in Layer 1, as shown in FIG. 2. Node 212 of the tree may correspond to a grammar for parsing the user input and may be implemented using a general GRXML. The grammar corresponding to node 212 may be used to detect phrases such as A. "I want to book a flight," B. "I've lost my account password," and C. "I want to speak with a supervisor." The grammar may be configured to match variations of phrases having equivalent meaning, such as "Book a flight," "make a flight reservation," and "I want to fly to San Francisco" for booking flights or "Reset my password," "I've forgotten my password," "Change my password" for resetting a password.

Based on the detected action, the customer may be routed to an appropriate node in the tree. For example, when a customer says that they would like to book a flight, the self-help system may route the customer to node 222 of Layer 2 for the automated agent to ask for a destination and node 232 of Layer 3 includes the definition of a grammar for detecting various valid destinations in various forms (e.g., "San Francisco," "Los Angeles," "New York," "SFO," "LAX," "JFK," "LaGuardia").

Alternatively, if the user says that they would like to reset their password, the self-help system routes the customer to node 224 of Layer 2, in which case the system prompts for a user name and node 234 may include the definition of a grammar for recognizing the spelling out of a user name (e.g., detecting individual letters and numbers).

Other Layer 2 nodes (e.g., node 226) may be provided in the tree to handle different types of input provided by the customer in node 212, such as detecting a request to route the call to a human supervisor or a request for information about an existing reservation.

Computer Assisted Customization of Self-Help Systems

Aspects of embodiments of the present invention are directed to systems and methods for assisting a designer of a self-help system in designing a dialogue graph (e.g., a dialogue tree) or automatically generating the dialogue graph, where the specifies the way in which a customer interacts with an automated self-help system. Aspects of embodiments of the present invention may use automatically generated Voice-XML and GRXML of possible dialogue (e.g., possible phrases spoken by a customer during an interaction) based on grammar building blocks extracted during a data-driven setup process as described in more detail in U.S. patent application Ser. No. 14/799,369 "DATA DRIVEN SPEECH ENABLED SELF-HELP SYSTEMS AND METHODS OF OPERATING THEREOF," the entire disclosure of which is incorporated herein by reference.

Aspects of embodiments of the present invention may also use automatic dialogue expansion to automatically suggest new dialogue routes to the grammar, where the routes may be suggested based on a phrase or a sentence manually entered by the designer of the self-help system.

According to one embodiment of the present invention, the automated self-help configuration module 45 may be used to configure the dialogue trees presented by the IMR 34. In particular, a system administrator or application designer may use the user interface 45*b* of the automated self-help configuration module 45 to configure the IMR 34. The automated self-help configuration module 45 may provide recommendations to assist the system designer in selecting and arranging the nodes of the dialogue tree based on information gathered from previous recorded conversations.

According to one aspect of embodiments of the present invention, a collection of recorded interactions (e.g., stored in the call recording storage 42 and the recognized text storage 46) between customers and human agents is collected and analyzed to generate the information for assisting system administrators in configuring the IMR 34 self-help system, where the recorded interactions relate to the types of circumstances to be handled by the automated self-help system. For example, to configure an airline company's self-help system for booking flights, the input recorded interactions should be those between customers and human agents related to the booking of flights.

Figure 3:
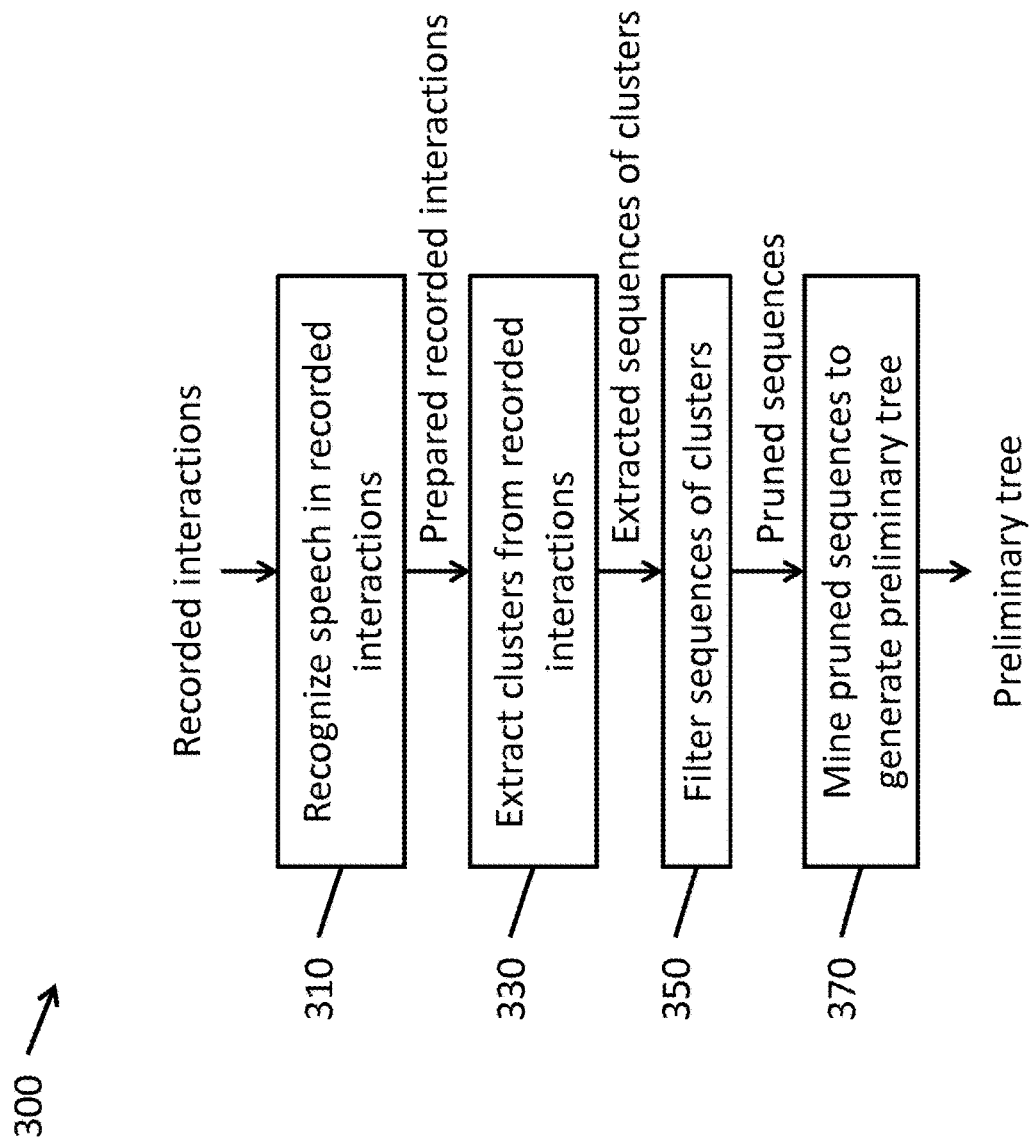
FIG. 3 is a flowchart illustrating a method for extracting interaction data from recorded interactions according to one embodiment of the present invention.

FIG. 3 is a flowchart illustrating a method 300 for extracting interaction data from recorded interactions according to one embodiment of the present invention. Referring to FIG. 3, the method 300 for extracting data from existing interactions includes: preparing data 310, extracting clusters 330, pruning data 350, mining the dialogue tree 370 to generate mined dialogue tree data, supplying the mined preliminary or raw dialogue tree data to the user interface 380, and generating a dialogue tree based on user input and the mined dialogue tree 390.

According to one embodiment of the present invention, any necessary initial processing on recorded interaction data is performed in operation 310. For example, the recorded data may include audio recordings of voice conversations between customers and agents. According to some embodiments of the present invention, the later operations analyze the customer audio and the agent audio separately. As such, in circumstances where the audio recordings are "monochannel" or "single channel" data where the customer and agent audio are on a single channel, speaker separation and classification techniques may be applied to the recorded interactions to generate "dual channel" audio in which the customer and agent speech are separated from one another (e.g., in different channels of the audio). Each interaction may be associated with a unique corresponding interaction identifier (or "interaction ID").

In operation 330, clusters (or topics) are extracted from the prepared interaction data to generate a plurality of extracted clusters (or topics). Techniques for automatically extracting clusters are described in, for example, U.S. patent application Ser. No. 14/799,369 "Data Driven Speech Enabled Self-Help Systems and Methods of Operating Thereof," the entire disclosure of which is incorporated herein by reference. These extraction techniques can be performed by the cluster extraction module 45*a* of the automated self-help configuration module 45. The extracted clusters include fragments of interactions that are semantically the same or similar, where each cluster includes information about which interaction it was found in (e.g., its associated interaction ID) and its location within the interaction (e.g., fragment start time if it is a spoken interaction or word location if the interaction is a text interaction such as an email). The clustering is performed separately on the customer and agent data streams.

Each cluster (or topic) is associated with a unique identifier (or "cluster ID" or "topic ID") and corresponds to a particular concept within an interaction. For example, some clusters may be associated with greetings, some clusters may be associated particular requests (e.g., various ways for a customer to state that the he or she wants to book a flight or various ways for an agent to request payment information) or particular responses (e.g., various ways to state departure and arrival cities or to state a seat preference).

As such, each interaction may be represented as a sequence of clusters or sequence of topics (e.g., the clusters corresponding to the fragments found in the interaction) along with an indication of whether a customer or an agent was the speaker (or, in the case of a text interaction, the writer) of the fragment.

Figures 4A, 4B:
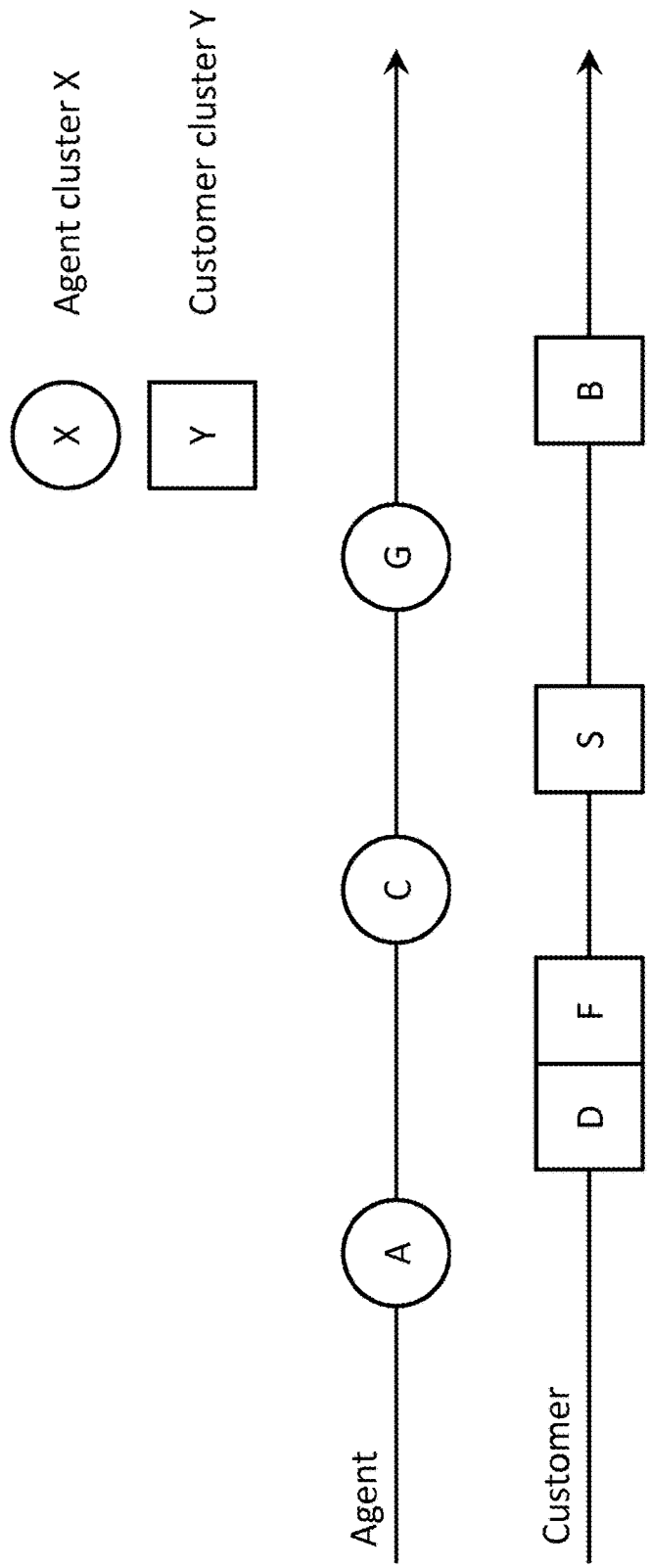
FIG. 4A is a schematic diagram illustrating an interaction between an agent and a customer, as abstracted into a sequence of clusters (or topics), according to one embodiment of the present invention.
FIG. 4B is a schematic illustration of a sequence of clusters (or topics) generated from the separately recognized clusters (or topics), according to one embodiment, where the sequence includes an indication of the speaker of the fragment associated with the clusters.

FIG. 4A is a schematic diagram illustrating an interaction between an agent and a customer, as abstracted into a sequence of clusters (or topics), according to one embodiment of the present invention. As shown, the agent side and customer side of the interaction are shown in separate lines. In this interaction, the agent began by stating a fragment from cluster A (e.g., a greeting), the customer responded with a fragment from cluster D (e.g., a response to a greeting) followed by a fragment from cluster F (e.g., a request to book a flight). The agent responded to the customer's fragment from cluster F with a fragment from cluster C (e.g., a request for a departure city) and the customer responded with a fragment from cluster S (e.g., the name of a departure city). The agent followed up with a fragment from cluster G (e.g., a request for a destination city) and the customer responded with a fragment from cluster B (e.g., the destination city name).

FIG. 4B is a schematic illustration of a sequence of clusters (or topics) generated from the separately recognized clusters (or topics), according to one embodiment, where the sequence includes an indication of the speaker of the fragment associated with the clusters. In FIG. 4B, the clusters associated with the agent are labeled with circles and the clusters associated with the customer are labeled with squares. In the example given above with respect to FIG. 4A, the cluster (or topic) sequence A, D, F, C, S, G, and B was generated.

In operation 350, the resulting sequences of clusters corresponding to interactions are filtered or pruned by the sequence pruning module 45*c* based on a criterion, e.g., based on whether the sequences resulted in successful interactions (e.g., to filter out unsuccessful interactions). According to one embodiment of the present invention, sequences are considered successful interactions based on one or more factors. One such factor is interactions that did not follow with a repeat call after a given period of time (e.g., two weeks) because a repeat call suggests that the first call did not resolve all of the issues. Another factor may be computed based on sentiment analysis (e.g., analysis of the clusters identified in the sequence and whether any of those clusters are associated with phrases of anger or disgust). A third factor may be computed based on explicit indications of successful interactions such as a customer's saying "thank you, you've been very helpful" or an agent's saying "is there anything else I can help you with?" On the other hand, an explicit indication of an unsuccessful interaction is a customer's escalation request such as: "I'd like to speak to your supervisor."

After the unsuccessful interactions have been filtered out, the remaining, successful sequences are mined in operation 370 by the tree mining module 45d to generate data associated with the dialogue tree, as described in more detail below. This data may be used to generate a dialogue tree or to generate recommendations for the system designer when constructing a dialogue tree.

In another embodiment of the present invention, in operation 350 sequences are pruned to filter out the successful interactions and the mining of operation 370 is performed on the unsuccessful interactions to generate data for warning a system designer if he or she attempts to design a dialogue tree with a "bad" sequence.

As described above, the speech enabled self-help system of the IMR 34 may be modeled as a dialogue tree with directed edges (or transitions). Formally, the dialogue tree T may include nodes representing a turn output of the agent side and grammars of potential responses from customers and the directed edges correspond to the actual input during the customer side turn.

As such, a system for supporting the design of the speech enabled self-help system is directed to designing a tree T that reflects typical successful sequential patterns of clusters observed in prior interactions between customers and human agents. In other words, in the designed tree T each of paths from the root node to the leaves corresponds to a common sequence of clusters in a successful interaction between an agent and a customer. In such a tree, each agent node describes the output for that node and each client node indicates the potential input for each of the edges and the destination node for each of those edges.

According to one embodiment of the present invention, the dialogue tree is generated by identifying only the most frequent subsequences of clusters. Feeding all of the sequences of successful interactions into a pattern mining algorithm can generate subsequences of frequent clusters. One such mining technique is described, for example, in U.S. patent application Ser. No. 13/952,470 "System and Method For Discovering and Exploring Concepts and Root Causes of Events," the entire disclosure of which is incorporated herein by reference. The resulting frequent subsequences of clusters may be supplied as suggestions of routes to the system designer via the user interface 45b and the system designer may connect these subsequences together to form the tree, as described in more detail below.

In another embodiment of the present invention, the tree mining module 45d generates an entire tree of potential interactions, as described in more detail below.

Figure 5:
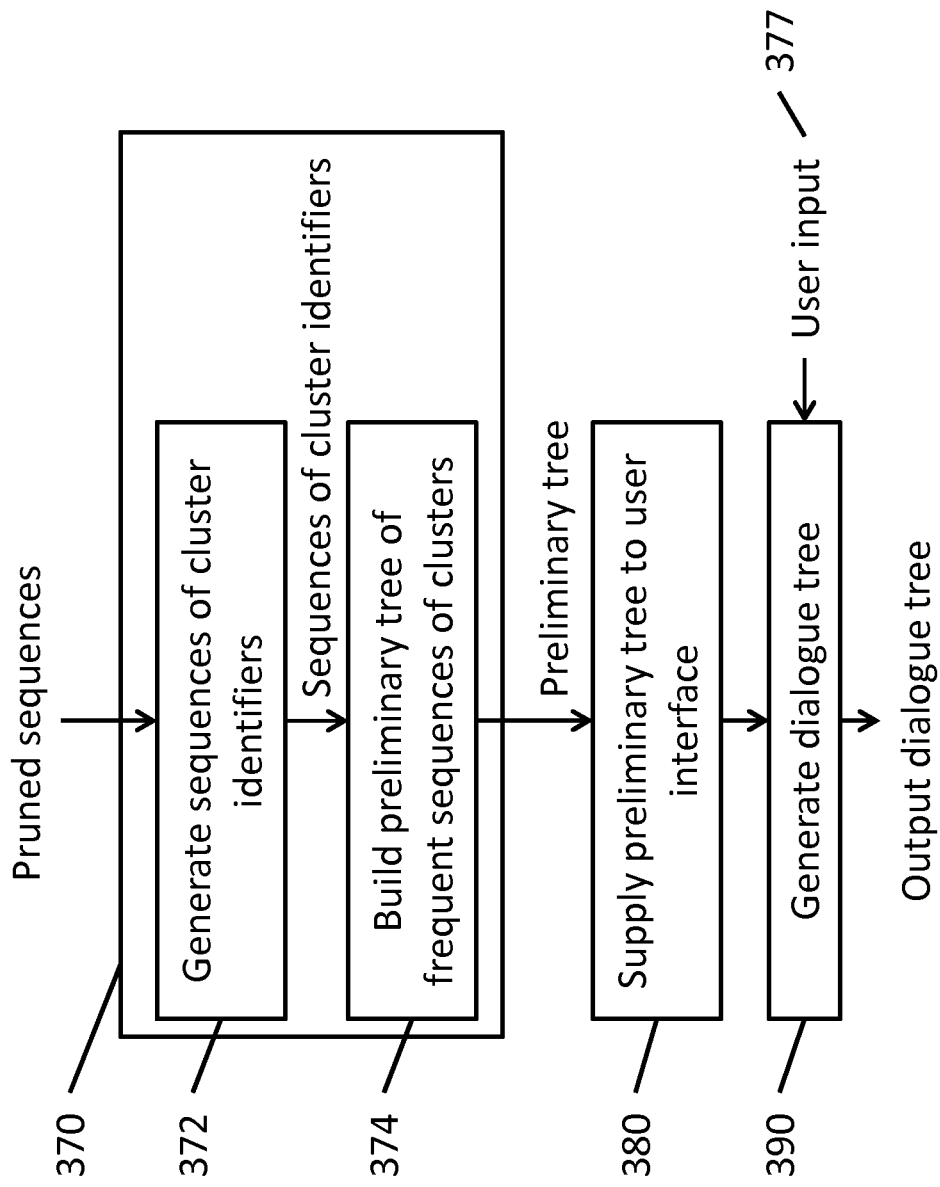
FIG. 5 is a flowchart illustrating a method for mining the pruned collection of sequences of clusters to generate a dialogue tree according to one embodiment of the present invention.

FIG. 5 is a flowchart illustrating a method for mining the pruned collection of sequences of clusters to generate a dialogue tree according to one embodiment of the present invention. According to this embodiment of the present invention, mining the dialogue tree 370 includes generating sequences of cluster IDs 372 and building a preliminary or raw tree of clusters 374. After mining the preliminary dialogue tree, in operation 380 the preliminary tree may be supplied to the user interface 45b and an output dialogue tree for the self-help system can then be generated in operation 390 based on the preliminary tree data and additional user input 377.

In one embodiment, generating the sequences of cluster identifiers from the pruned sequences in operation 372 includes condensing the sequences by removing consecutive repetitions of cluster identifiers. Some methods for doing so according to embodiments of the present invention are described in more detail in the above referenced U.S. patent application Ser. No. 13/952,470 "System and Method For Discovering and Exploring Concepts and Root Causes of Events." For example, the sequence A-D-D-D-F-C-C-S-G-B may be condensed by replacing the consecutive repetitions D-D-D and C-C with a single instance of each (e.g., D and C, respectively) to generate the condensed sequence A-D-F-C-S-G-B.

Figure 6:
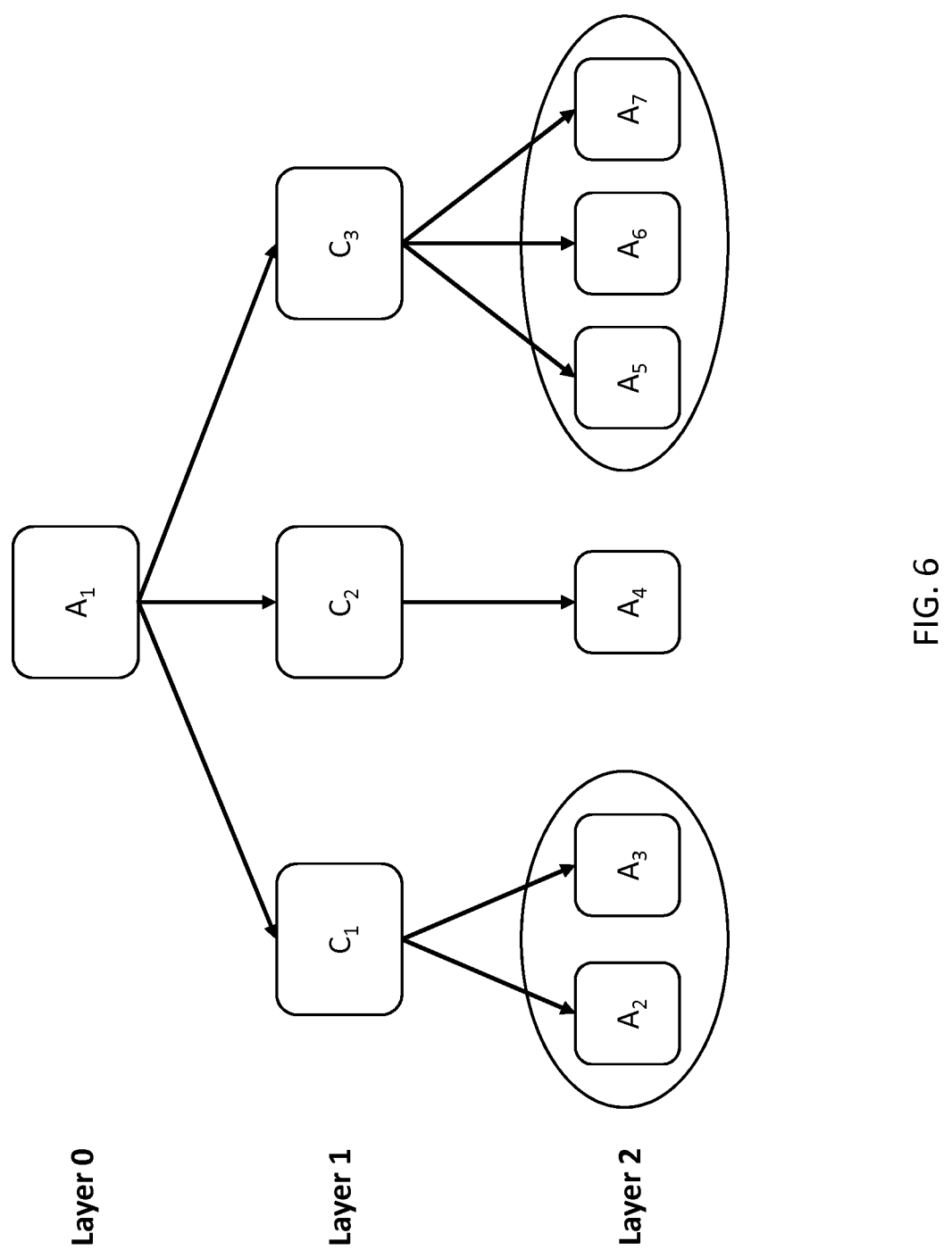
FIG. 6 is an example of an automatically generated preliminary or raw dialogue tree T according to one embodiment of the present invention.

In operation 374, the automated self-help system configuration module 45 generates the preliminary dialogue tree T from the condensed sequences by matching starting subsequences of the sequences (or "prefixes" of the subsequences). FIG. 6 is an example of an automatically generated preliminary dialogue tree T according to one embodiment of the present invention, discussed in more detail below.

According to one embodiment of the present invention, an approach similar to the PrefixSpan algorithm described in Pei, J., Han, J., Mortazavi-Asl, B., Wang, J., Pinto, H., Chen, Q., . . . & Hsu, M. C. (2004). Mining Sequential Patterns by Pattern-Growth: The PrefixSpan Approach. *Knowledge and Data Engineering, IEEE Transactions on,* 16(11), 1424-1440, the entire disclosure of which is incorporated herein by reference.

In more detail, according to one embodiment of the present invention, one input of the PrefixSpan algorithm is a minimum support k (or number of occurrences, e.g., the minimum number of occurrences of a particular sequence within the entire collection of input sequences) such that any frequent pattern mined using the algorithm has support greater than or equal to k. The value of k can be set or adjusted by a user (e.g., the system designer) based on characteristics of the input collection of recorded interactions (e.g., based on how frequently a sequence needs to occur in the recorded interactions order for that sequence to be considered a frequent pattern).

In a standard application of the PrefixSpan algorithm to a projected database (PDB) of each frequent pattern $\alpha$, the algorithm counts the number of suffixes that contain each cluster ID in order to find those that appear frequently enough to meet the support threshold k.

Similarly, in embodiments of the present invention, the support threshold k corresponds to the concept that, in the output dialogue tree T, every path from the root to the leaves has support$\geq$k (e.g., that, for every sequence of clusters found along path from the root to the leaves of the tree, there are at least k instances of the sequence in the collection of recorded interactions or the sequence database (SDB) which serves as an input to the dialogue tree mining process described in more detail below).

However, in contrast to the standard PrefixSpan algorithm, according to one embodiment of the present invention, the automated self-help system configuration module 45 counts only clusters of the "other side" (e.g., a side that is complementary to the last side of a). For example, if the prefix pattern α ends with an agent (A) cluster, then only customer (C) clusters will be counted and vice versa. Building the prefix tree in this way results in a tree with alternating layers of A clusters and C clusters. In addition, embodiments of the present invention explicitly construct the dialogue tree T. In particular, for each frequent cluster x, the automated self-help configuration module 45 connects a child node x to the parent node α and continues developing the tree recursively from the projected database (PDB) $S|_{\alpha \circ x}$, where S is the sequence database (SDB), $S|_\alpha$ is the PDB of S with prefix α (the PDB having a set of suffixes of sequences in S that come right after the pattern α in the sequence), α∘x is the concatenation of the pattern α and the sequence x. Generally, a PDB $S|_{\alpha \circ x}$ may be constructed by counting the number of sequences a symbol x appears in the current layer and its location in the sequence. If the count exceeds a support threshold, then a PDB is created with a prefix ending with x and the items in the PDB are extracted according to the identified locations in the sequences.

FIG. 6 is an example of an automatically generated preliminary dialogue tree according to one embodiment of the present invention. The example dialogue tree alternates between agent layers (Layers 0 and 2) and customer layers (Layer 1) however embodiments of the present invention are not limited thereto and may generate trees having more than three layers. In FIG. 6, the nodes of the agent layers are labeled with the letter A and the nodes of the customer layer are labeled with the letter C. Layer 0 includes only node $A_1$ and includes three outgoing edges to the three nodes of Layer 1: $C_1$, $C_2$, and $C_3$. The nodes of Layer 1 correspond to different types of responses that are observed from a customer. Layer 2 includes the nodes $A_2$, $A_3$, $A_4$, $A_5$, $A_6$, and $A_7$. Two edges connect node $C_1$ to nodes $A_2$ and $A_3$, respectively. Similarly, three edges connect node $C_3$ to nodes $A_5$, $A_6$, and $A_7$, respectively and one edge connects node $C_2$ to node $A_4$. Nodes $A_2$ and $A_3$ are grouped together and nodes $A_5$, $A_6$, and $A_7$ are grouped together, as indicated by the ovals drawn around these nodes. In particular, this indicates that the content of nodes $A_2$ and $A_3$ may be merged together and the content of nodes $A_5$, $A_6$, and $A_7$ may be merged. The merged nodes may have substantially different content. For example, if node $C_1$ corresponded to the customer statement: "I want to book a flight," then node $A_2$ might be correspond to the agent response: "Where would you like to go?" and node $A_3$ might correspond to the agent response: "When do you want to depart?" As such, according to some embodiments of the present invention, during the design process, the system designer may select a particular one of the nodes to be included in the final dialogue tree. The nodes may be selected based on one or more criteria, such as duration of the dialogue, successful completion, and customer satisfaction.

The generation of the dialogue tree (DialogueTreeMiner) in operation 374 may be represented by the following pseudocode, where a is the current prefix pattern (e.g., a sequence of clusters), $S|_\alpha$ is the PDB with prefix α, side(x) is the side A or C of cluster id x, last(α) is the last cluster id in prefix α, and sup(c) is the support for c in relation to the PDB $S|_\alpha$.

DialogueTreeMiner(Prefix α, PDB $S|_\alpha$, Tree T)
  a. Scan $S|_\alpha$ and find frequent clusters $F=\{\text{cluster } x | \text{side}(x) \neq \text{side}(\text{last}(\alpha)) \wedge \text{sup}(x) \geq k\}$ b. For each b∈F
    i. α'=α∘b //Concatenation of α and b
    ii. Build PDB $S|_{\alpha'}$
    iii. SubTree←DialogueTreeMiner(α',$S|_{\alpha'}$,T)
    iv. CreateNode(α)
    v. Extend T by connecting SubTree as a child to the current parent node α
  c. Return T The process may begin by making the initial function call:
DialogueTreeMiner(ε, S, EmptyTree)
where S is the whole sequence database (SDB), ε is the empty string, and last(ε) is defined as C, and EmptyTree is a tree initialized with an ε node.

The result of running the DialogueTreeMiner is a tree T where all of its paths have support≥k and have a dialogue structure of A→C→A→C. Alternatively, the tree T can be considered as containing all of the paths with those characteristics from the SDB.

In operation 380, the automated self-help configuration module 45 then supplies the resulting tree T to the user interface 45b. The system designer may then review the resulting tree to choose a root node, e.g., the phrase that the automated agent of the IMR 34 should start with. Generally, the root is the most frequent one of the clusters having the highest support, such as a "greeting" cluster. The system designer may supply user input 377 to generate the final tree in operation 390.

In another embodiment of the present invention, the system designer identifies the root node before running the DialogueTreeMiner process and, instead, supplies the selected root node to DialogueTreeMiner, e.g., by making the initial function call:
DialogueTreeMiner("Greeting", S, CreateNode ("Greeting"))

In operation 390, the resulting tree T is used to design the final agent nodes and caller transitions based on additional user input 377 from the system designer. Generally, agent cluster nodes (that are child nodes to customer cluster nodes) correspond to different possibilities for what the automated agent may say in the dialogue. These groups of clusters are merged by the designer to build a response for the agent side at that point of an interaction. For example, in one embodiment the agent nodes are merged into Voice-XML entries representing the current menu.

Caller cluster nodes (that are children of an agent cluster node) correspond to the different possibilities for what a customer can say in the self-help system dialogue. This group of clusters may be used by the designer to build a grammar for recognizing the various typical forms of user input in the interaction at this point in the interaction and, in one embodiment, are merged into a GRXML grammar representing the various grammars, where each slot in the GRXML corresponds to a different customer cluster and each customer cluster determines the routing for the next dialogue by directing to the appropriate descendent in the tree (see, e.g., the three customer nodes $C_1$, $C_2$, and $C_3$ in Layer 1 of FIG. 6 with corresponding descendent nodes in Layer 2).

Figure 7:
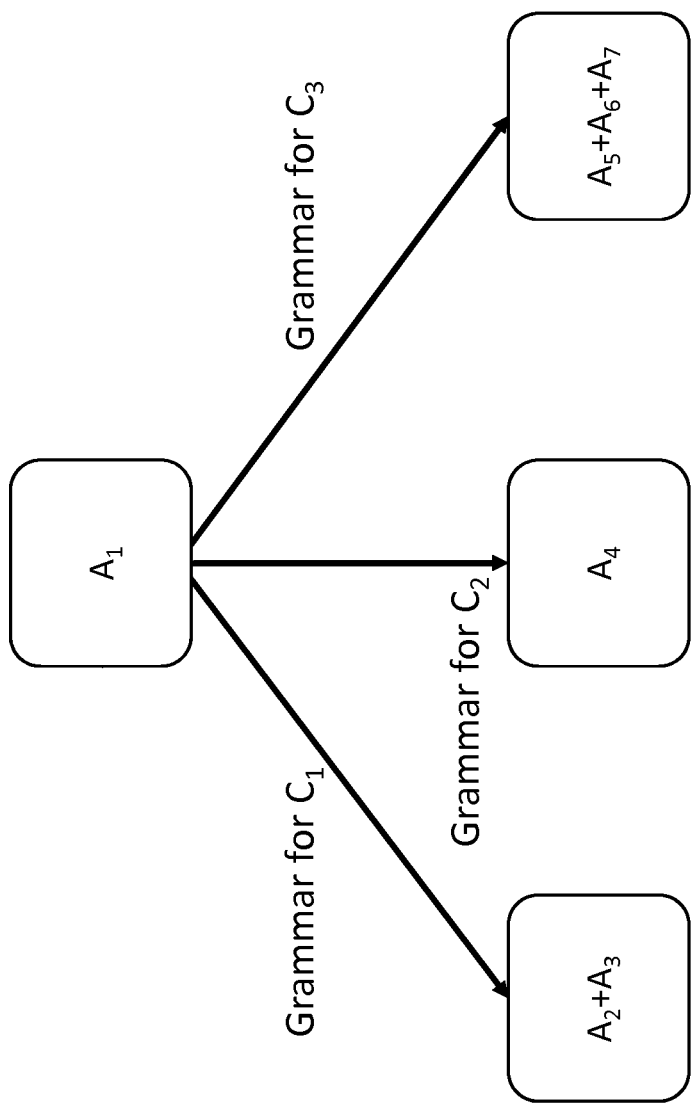
FIG. 7 illustrates a resulting dialogue tree generated based on the tree shown in FIG. 6 and based on user input according to one embodiment of the present invention.

FIG. 7 illustrates a resulting dialogue tree generated in operation 390 based on the tree shown in FIG. 6 and based on user input 377, where the agent nodes $A_2$, $A_3$, $A_4$, $A_5$, $A_6$, and $A_7$ are replaced with merged agent nodes $A_2+A_3$, $A_4$, and $A_5+A_6+A_7$ and the customer nodes $C_1$, $C_2$, and $C_3$ are replaced with labeled edges corresponding to the grammars (e.g., GRXML grammars) developed for each of these nodes.

Automatic Dialogue Expansion

One aspect of embodiments of the present invention is directed to systems and methods for assisting a system designer in building a rich dialogue tree that covers the different routes that a customer may potentially choose during the interaction. These techniques may also be used to improve or optimize existing self-help systems.

Figure 8:
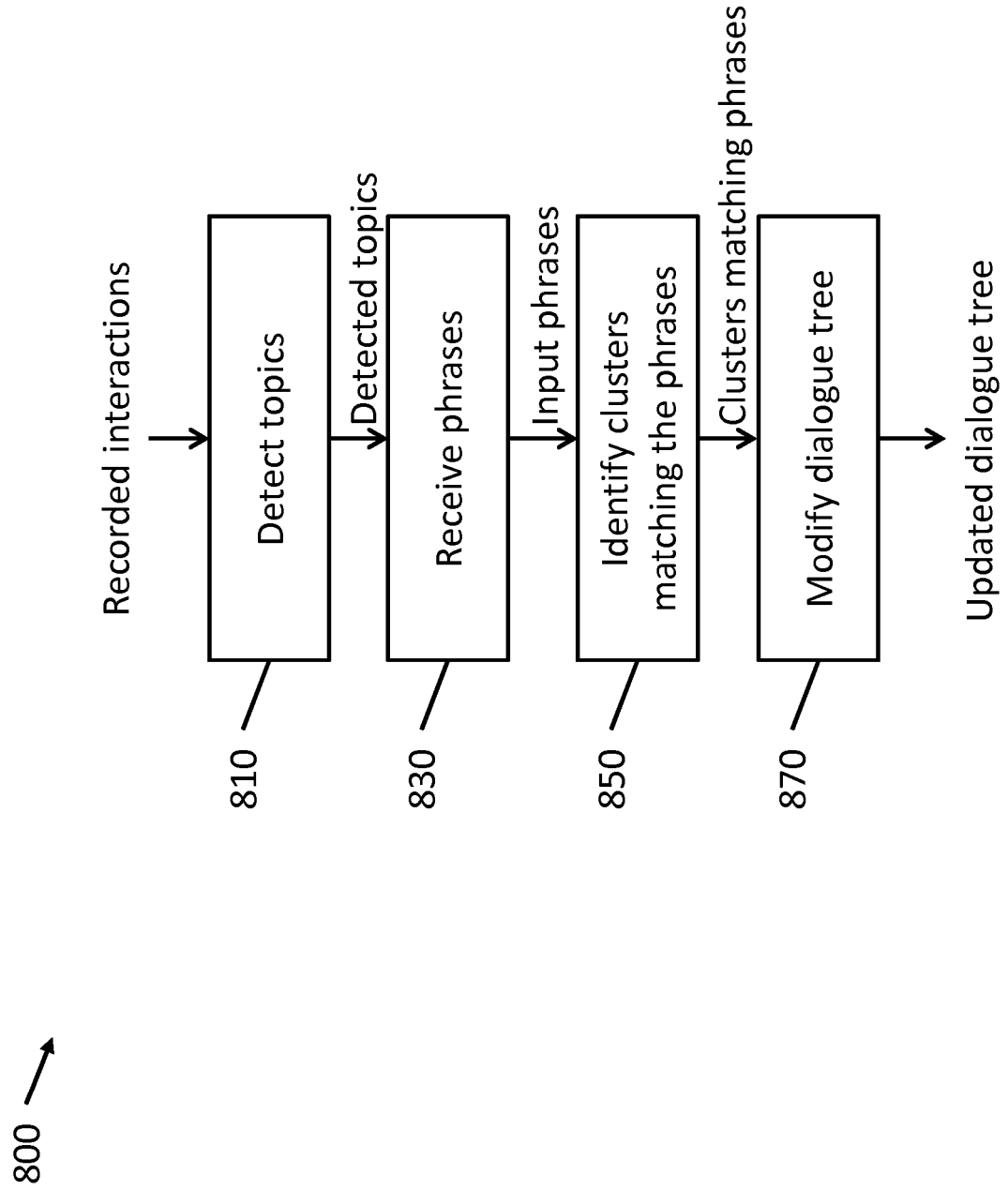
FIG. 8 is a flowchart illustrating a method for performing automatic dialogue expansion according to one embodiment of the present invention.

FIG. 8 is a flowchart illustrating a method 800 for performing automatic dialogue expansion according to one embodiment of the present invention.

According to one embodiment of the present invention, the dialogue expansion module 45e of the automated self-help system configuration module 45 applies systems and techniques described in U.S. patent application Ser. No. 14/586,730 "System and Method for Interactive Multi-Resolution Topic Detection and Tracking" to all of the available recorded interactions in operation 810 to detect topics within the recorded interactions.

In operation 830, one or more input phrases are received. These input phrases may be, for example, phrases found in an existing dialogue tree or may be phrases that are input by a system designer via the user interface 45b while the user is designing or modifying a dialogue tree.

For each of the received input phrases, in operation 850 the automated self-help configuration module identifies a list of one or more probable clusters corresponding to the phrase (e.g., based on computing semantic distances between the input phrase and each of the clusters and identifying clusters having a semantic distance below a threshold). The identified clusters may then be inserted into the dialogue tree as expansions of the existing grammars according to the sequences extracted in the automatic dialogue tree generation process described above, thereby allowing the self-help system to recognize a wide range of possible customer responses, as mined from previously recorded interactions.

The identified clusters may also be displayed to the system designer via the user interface 45b in order for the system designer to decide whether or not it would be appropriate to expand particular phrases in the dialogue tree to include the identified clusters.

The suggested clusters may be added by adding the grammar (e.g., GRXML) for the cluster to the customer response edges of the dialogue tree. The grammars may be associated with the most probable clusters extracted by the pattern mining process described above.

The system designer may also choose to add more than one cluster, thereby providing the user with multiple possible paths from the current agent node to the next dialogue layer, thereby further enlarging the dialogue graph.

According to one embodiment of the present invention, when a system designer adds a grammar for a customer response, the automated self-help system configuration module 45 may also suggest possible paths of agent phrases to follow, based on the sequences and patterns extracted from the recorded interactions. For example, if the system designer adds a customer edge for receiving a credit card number, the automated self-help system configuration module 45 may suggest that the agent ask for a credit card expiration date if the automated self-help system configuration module 45 detected the pattern "credit card number," "request for expiration date," and "expiration date" in many of the recorded interactions.

If the system designer inserts a new phrase to be spoken by the automated self-help system of the IMR 34 (e.g., a text phrase to be processed by a text-to-speech module) as part of the VoiceXML, then the dialogue expansion module 45e may generate one or more alternative phrases that may be used instead of the inserted phrase. These alternative phrases may be generated by identifying the cluster that is closest to the new phrase and providing the phrases found in that cluster.

In operation 870, the automated self-help configuration module 45 modifies the dialogue tree based on, for example, the detected clusters matching phrases and/or based on the input from the system designer and returns the updated dialogue tree.

According to another embodiment of the present invention, a dialogue can be expanded from a certain point x by mining a tree rooted at this point x by calling
DialogueTreeMiner("X",S,CreateNode("X"))
thereby resulting in a whole new subtree of options that can be concatenated to the current dialogue after processing.

Figure 9:
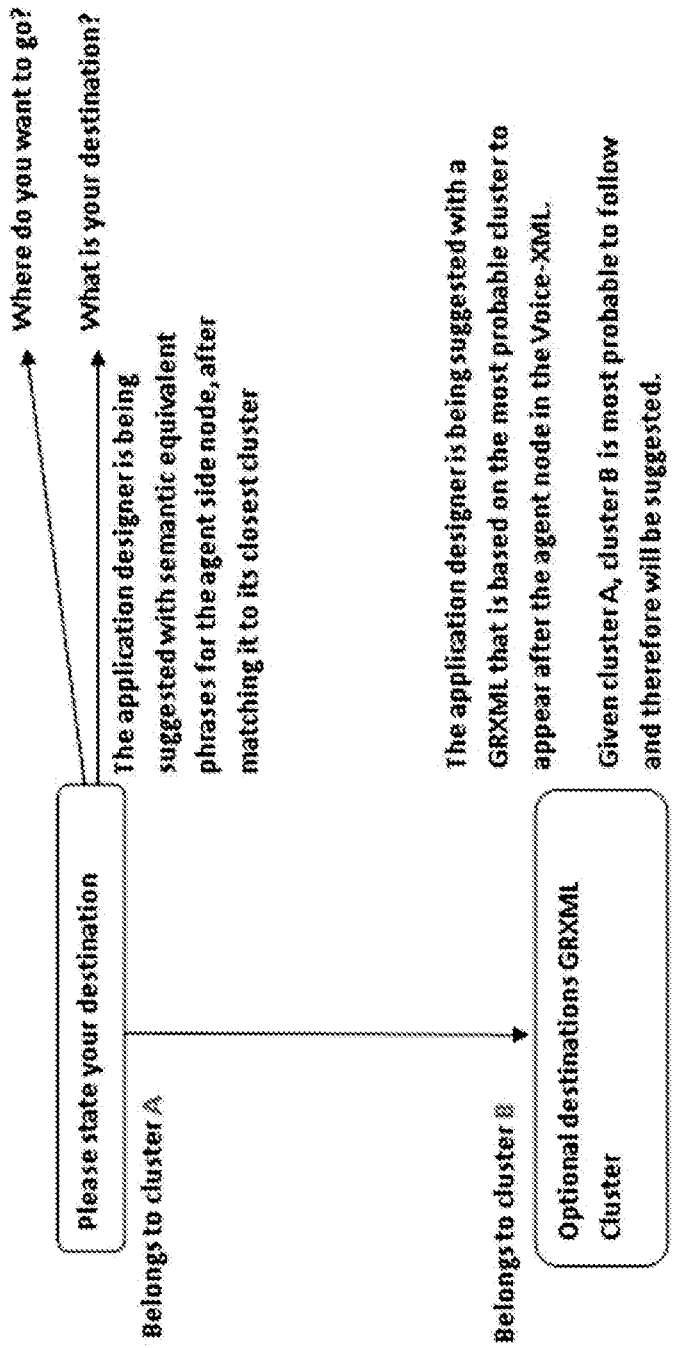
FIG. 9 is a diagram illustrating a process according to one embodiment of the present invention for a system designer to add an agent node to a dialogue tree.
Figure 10:
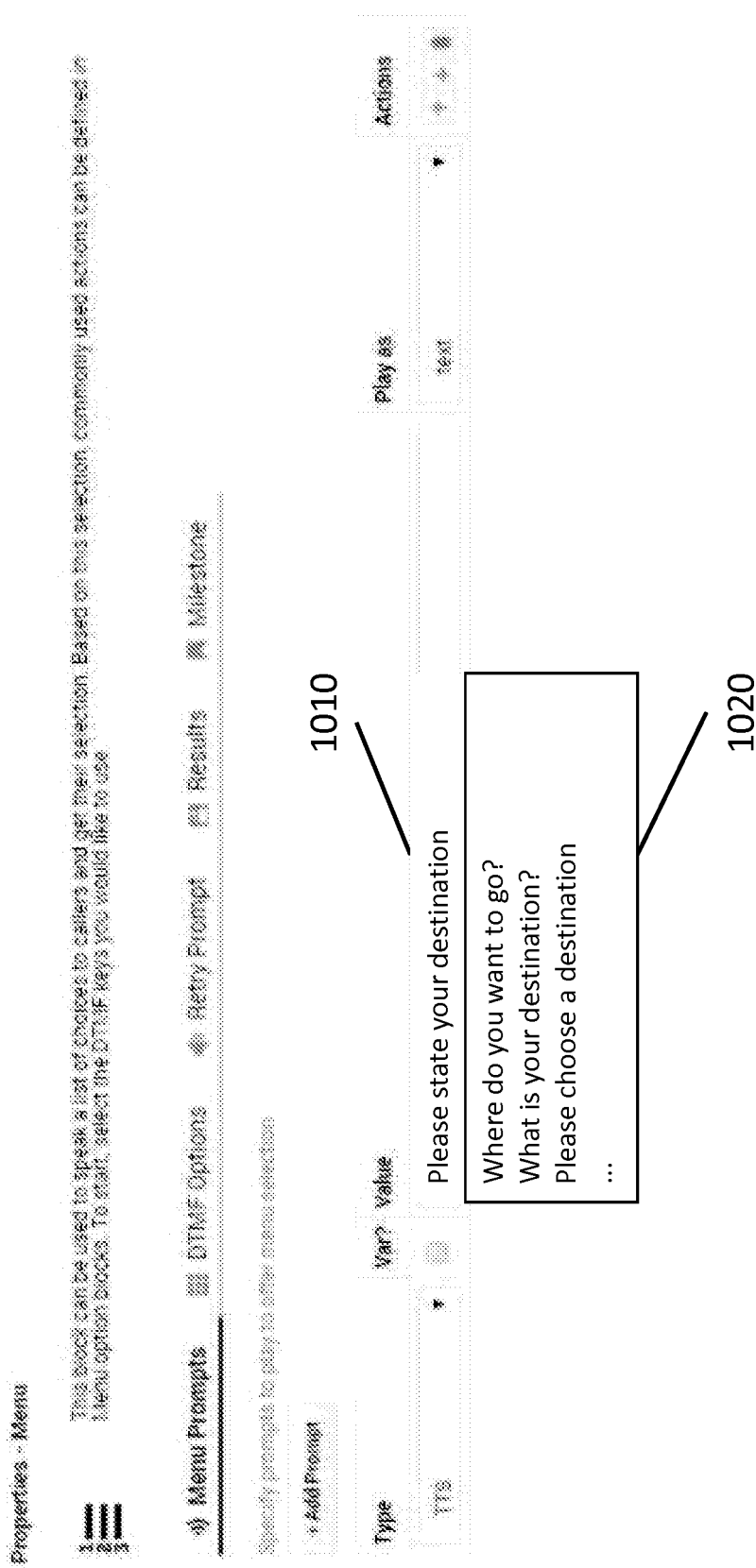
FIG. 10 is a screenshot of a user interface providing suggested alternative agent phrases according to one embodiment of the present invention.

FIG. 9 is a diagram illustrating a process according to one embodiment of the present invention for a system designer to add an agent node to a dialogue tree. FIG. 10 is a screenshot of a user interface providing suggested alternative agent phrases according to one embodiment of the present invention. As seen in FIGS. 9 and 10, the system designer enters the input phrase 1010 "Please state your destination" using the user interface module 45b to create a new node. The automated self-help system configuration module 45 suggests the semantically equivalent phrases 1020 "Where do you want to go?" "What is your destination?" and "Please choose a destination" by matching the input phrase "Please state your destination" with the closest matching cluster (e.g. "Cluster A"). The system designer can then select from these alternatives based on which phrase is used most frequently or which phrase sounds the most natural or comfortable.

Figure 11:
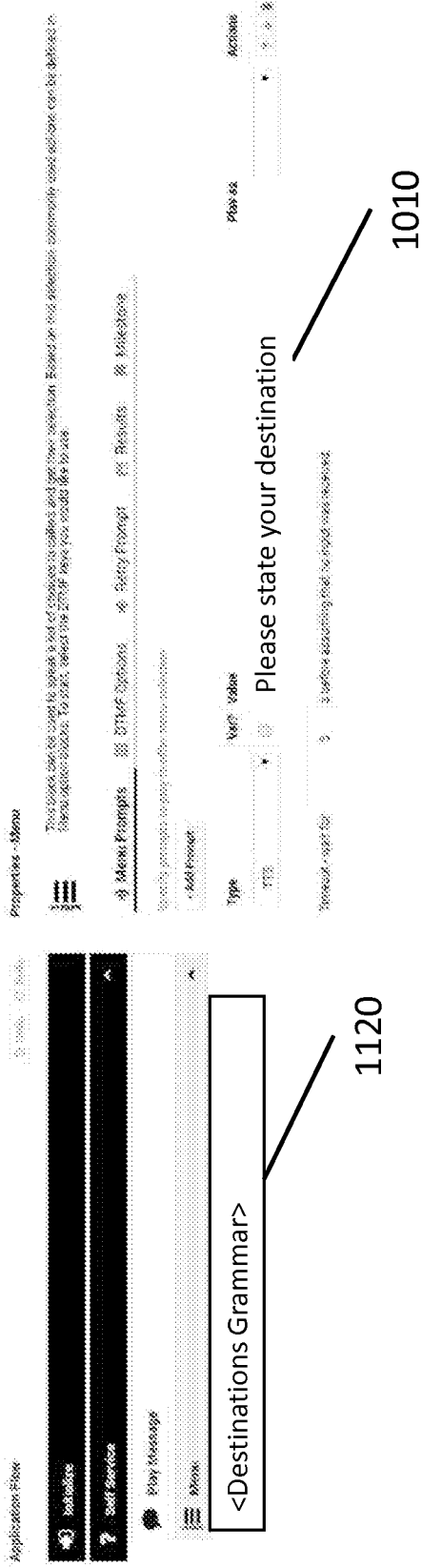
FIG. 11 is a screenshot of a user interface providing suggested grammars based on the provided input according to one embodiment of the present invention.

Referring to FIG. 9, the automated self-help system configuration module 45 may also automatically suggest probable customer response clusters. FIG. 11 is a screenshot of a user interface providing suggested grammars based on the provided input according to one embodiment of the present invention. For example, after determining that the input phrase "Please state your destination" corresponds to cluster A and assuming that the previous mining of the recorded interactions determines that cluster B, where the customer provides a destination, is the most probable cluster to follow cluster A, the automated self-help system configuration module 45 may suggest adding a grammar 1120 (e.g., GRXML) for matching "destinations."

As such, aspects of embodiments of the present invention provide systems and methods for automatically mining recorded interactions to detect frequent patterns of interactions between customers and agents and to use the result of the mining process to assist system designers in designing and customizing a dialogue true for an automated self-help system by suggesting alternative phrases on the agent side, likely grammars on the customer side, and likely sequences of agent and customer clusters in the dialogue tree.

Dialogue Flow Optimization

As discussed above, when the automated self-help configuration module 45 suggests clusters or phrases to a system designer, the system designer may select an appropriate next cluster in the dialogue tree based on his or her judgment.

Some aspects of embodiments of the present invention are directed to a smart filtering framework for creating an optimized dialogue by filtering the input data according to one or more of criteria (e.g., based on the similarity function and clustering described below) in order to improve or optimize the dialogue flow. These criteria may include, for example: overall interaction time (or interaction length), ease of use (e.g., sequences appearing more frequently in the recorded interactions), success rate, and combinations thereof. After filtering the data, the DialogueTreeMiner process described above may be applied to the filtered input, resulting in a dialogue tree (DT) that is adjusted (e.g., improved or optimized) based on the chosen criteria (e.g., interaction length, success rate, and customer satisfaction). The DialogueTreeMiner process can be used to define a dialogue tree system from scratch or to expand an existing dialogue tree system as described above in the section "Automatic Dialogue Expansion."

Some aspects of embodiments of the present invention are directed to automatically or semi-automatically choosing the paths of the output dialogue tree given a raw tree output from the DialogueTreeMiner process, where the choice of the best path may be determined, in part, by optimization criteria such as interaction length, success rate, and customer satisfaction.

In addition, other aspects of embodiments of the present invention are directed to providing a personalized interaction experience with the automated self-help system, where the interaction is personalized in real-time based on the caller's characteristics such as gender, age, location, and other information known about the customer. This may also be done dynamically during the call, for instance, by detecting the gender of the customer automatically during the call (see, e.g., GDNN—A Gender Dependent Neural Network for Continuous Speech Recognition [Konig, et al 1991]).

According to one embodiment of the present invention, when the system the automated self-help configuration module 45 suggests, via the user interface 45b, different paths (e.g., nodes and edges) to add to a dialogue tree, where the suggestions are sorted by each of the criteria or combinations thereof (e.g., a linear combination of the criteria).

Figure 12A:
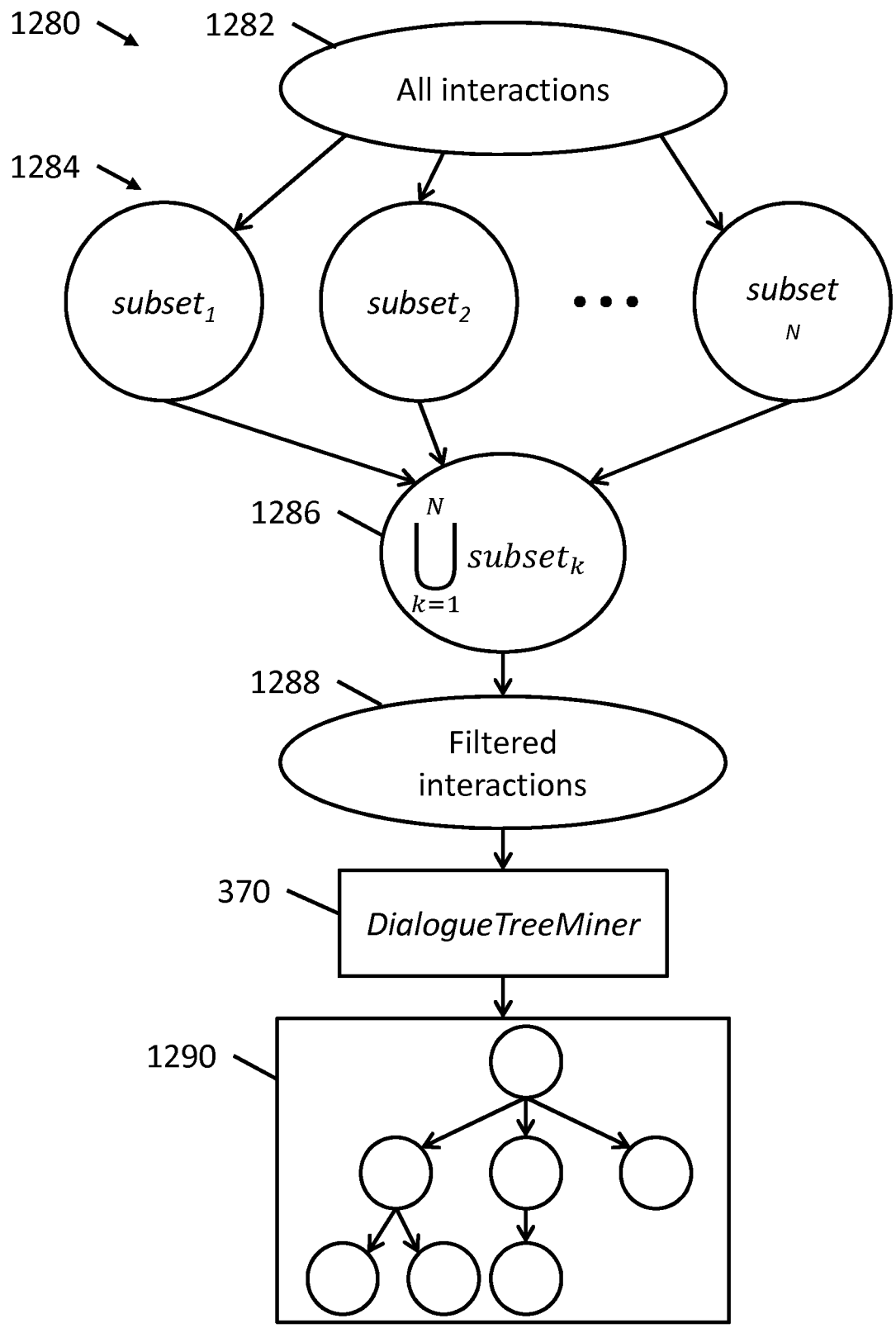
FIG. 12A is a schematic diagram of a process for clustering, filtering, and mining interactions to generate a dialogue tree according to one embodiment of the present invention.

FIG. 12A is a schematic diagram of a process for clustering, filtering, and mining interactions 1282 to generate a dialogue tree according to one embodiment of the present invention. In order to perform filtering on the set of sequences of cluster ids to filter out unwanted interactions without losing the semantic topics discussed in the data set. Generally, this involves representing each interaction at a higher semantic level (e.g., representing the interactions with a low dimensional bag of clusters assigned for each interaction), defining a similarity function operating in the space of this higher semantic level, applying the similarity function to cluster the interactions into subsets 1284, each subset corresponding to interactions with different semantic content, and filtering each of the subsets independently by taking the top percentiles of data from each subset and combining the subsets together (oval 1286). The combined, filtered interactions 1288 may then be supplied to the DialogueTreeMiner process 370 to generate a dialogue tree 1290.

Figure 12B:
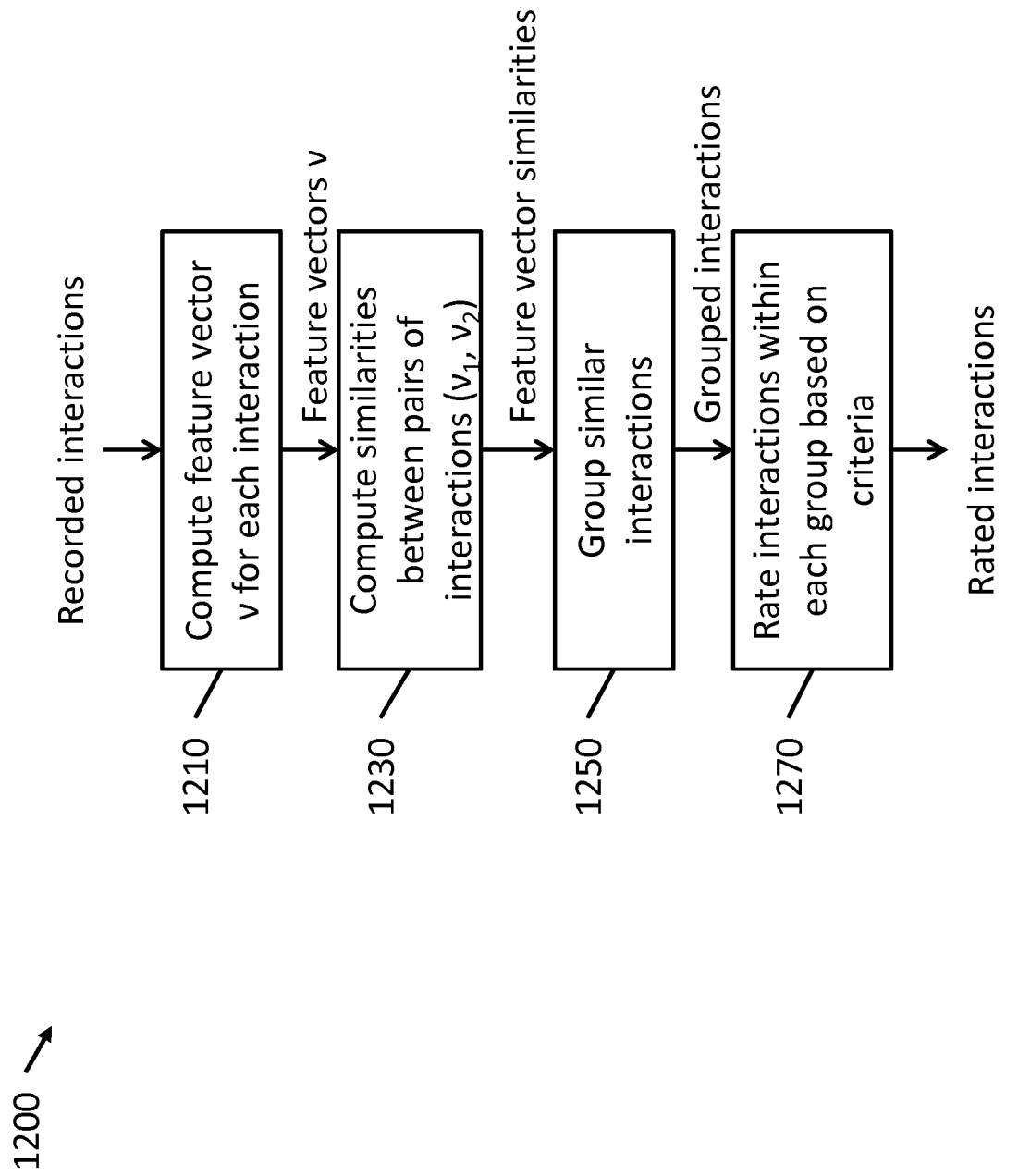
FIG. 12B is a flowchart illustrating a method 1200 for rating the performance of various sequences.

FIG. 12B is a flowchart illustrating a method 1200 for rating the performance of various sequences in more detail. In operation 1210, the recorded interactions are analyzed to represent each interaction as a feature vector v or "bag of clusters" (where the kth interaction may be represented by the feature vector $v_k$) that corresponds to the clusters contained in the interaction. For example, interactions that relate to booking a flight will include phrases from a first set of clusters while interactions containing phrases that relate to changing a password will include phrases from a second, different set of clusters.

In operation 1230, the similarities between pairs of feature vectors ($v_1$, $v_2$) are computed to generate a set of feature vector similarities. Similar interactions (e.g., interactions having a similarity above a threshold) are grouped together in operation 1250 and the interactions in each group are rated based on the given criteria in operation 1270 (e.g., the interactions can be ranked within each group).

When rating sequences of clusters based on criteria that do not depend on success rate, such as interaction time and ease of use, only successful interactions are analyzed. On the other hand, when rating sequences based on success rate, all interactions are analyzed because the success rate is calculated based on:

$$\frac{\text{\#Successful interactions}}{\text{\#Successful interactions} + \text{\#Unsuccessful interactions}}$$

Figure 12C:
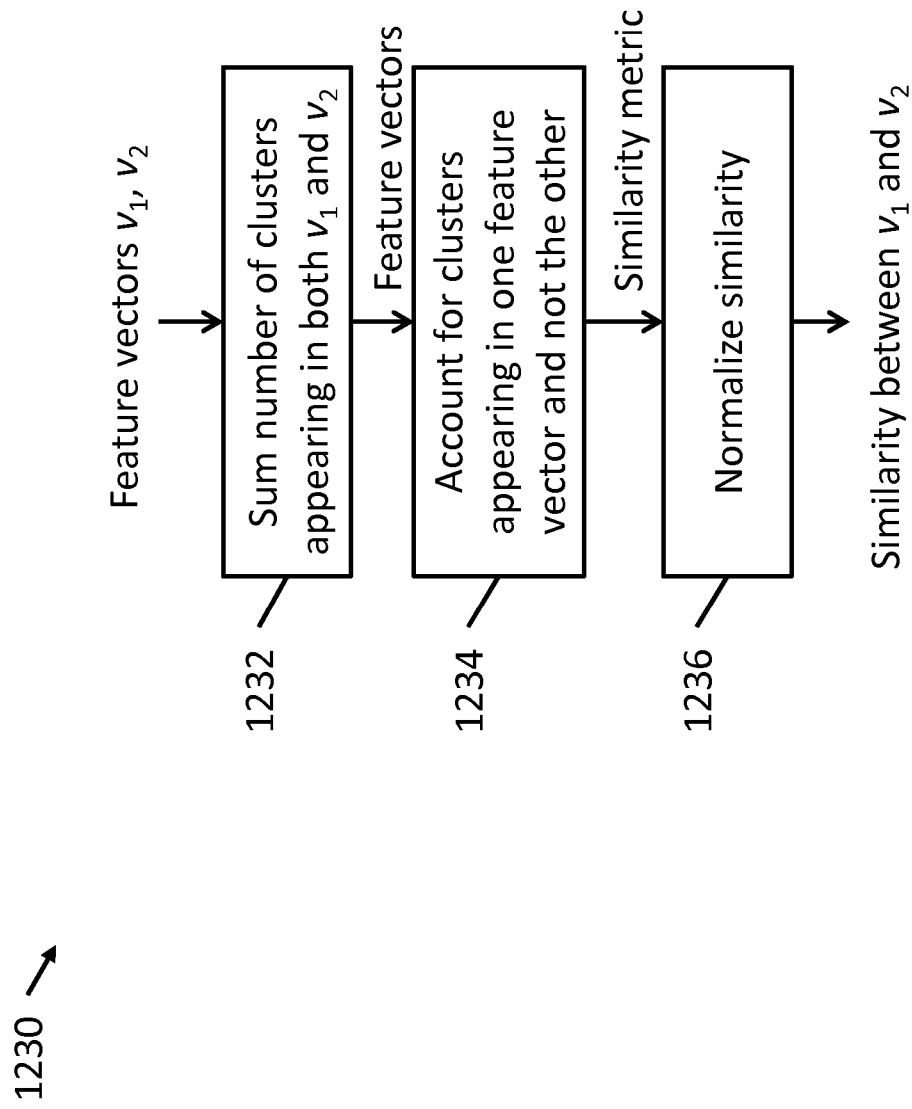
FIG. 12C is a flowchart of a method for computing similarity between two bags of clusters ($v_1$, $v_2$) according to one embodiment of the present invention.

FIG. 12C is a flowchart of a method for computing similarity between two bags of clusters ($v_1$, $v_2$) according to one embodiment of the present invention. (In the below discussion, $v_i^j$ denotes cluster j in bag of clusters i.)

In operation 1232, the automated self-help configuration module initializes the similarity D between $v_1$ and $v_2$ by summing up the number of clusters which appear in both interactions. In other words, by computing the dot product between the two binary vectors of the bags of clusters:

$$D(v_1,v_2)=v_1^T\cdot v_2$$

In operation 1234, clusters appearing in one feature vector but not the other are accounted for by adding an adjustment term d for the cluster $c_i$ that is not in common, where $d(c_i,v_p)$ is defined as:

$$\max_j(\text{Cosine Similarity}(Word2Vec(\text{cluster label}(c_i)), Word2Vec(\text{cluster label}(v_p^j))))$$

This procedure may be performed for every cluster $c_i$ detected in the recorded interactions such that the similarity $D(v_1,v_2)$ is updated according to:

if ($c_i \in v_1$ and $c_i \notin v_2$) then $D(v_1,v_2)=D(v_1,v_2)+d(c_i,v_2)$ else if ($c_i \notin v_1$ and $c_i \in v_2$) then $D(v_1,v_2)=D(v_1,v_2)+d(c_i,v_1)$ After summing up all of the similarities, in operation 1236 the computed similarity $D(v_1,v_2)$ can be normalized by the vector size to get a value between 0 and 1:

$$D(v_1, v_2) = \frac{D(v_1, v_2)}{\max(|v_1||v_2|)}$$

Bags of clusters with high similarity (e.g., above a threshold T) are then considered to be similar interactions in operation 1250. As such, given the entire set of interactions and the similarity function above, the set of interactions can be clustered using a document clustering method such as the one described in U.S. patent application Ser. No. 13/952,470, incorporated by reference above, thereby resulting in subsets of interactions, where each interaction is a subset of interactions that are similar to one another at a higher, semantic level.

The rated interactions, sorted into groups, may then be filtered and then presented to the system designer to aid in the design of the dialogue tree based on the suggestions. The filtered interactions can be fed to the DTM algorithm for getting a tree pattern, or to a sequence mining algorithm for getting specific suggestions.

The filtering may be performed according to some optimization criteria specified by the system designer. The criteria may include, for example, time for resolution by organizing the interactions by time to resolution of issue and identifying the low percentiles. The criteria may also include identify interactions exceeding a threshold level of success as determined, for example, looking for features of a call that indicate customer sentiment such as the presence of the "satisfaction" topic, the absence of the "dissatisfaction" topic, a manual review of the interaction, or the result of a customer survey (e.g., ratings on a scale of 1-5 and averaging the ratings across multiple interactions) or by using a repeated call (e.g., a customer calling again within a short time of a previous call) to identify customer dissatisfaction.

For example, in the case of improving the tree by attempting to reduce the amount of time spent for each interaction, all of the feature vectors corresponding to a particular desired path through the dialogue tree are presented to the designer, sorted by average time to completion of the interaction (e.g., average duration of interaction). For example, if the system designer is designing a portion of the dialogue tree for booking flights, a group of sequences for previous interactions corresponding to the booking of a flight may be presented and sorted based on average resolution time for the particular sequence of clusters (e.g., interactions in which the agent asked for "departure city," "destination city," and "dates of travel," in the stated order, may be in the same group as interactions in which the agent asked for "dates of travel" before asking for "departure city" and "destination city," but may be represented as a different sequence).

As another example, when "popularity" or "frequency" is the selected criterion, it is assumed that routes or sequences of clusters that are used more frequently in interactions between customers and human agents correspond to the more common and comfortable patterns for the dialogue tree. Based on this example, instead of sorting the sequences by the average duration of the interaction, the sequences may be sorted by the frequency with which they appear in the recorded interactions and a designer may choose the more popular sequences for the dialogue tree because these may be the most comfortable or familiar for a user.

As a third example, the sequences may be sorted by their success rates, e.g., the fraction of interactions that resulted in a successful completion of the issue raised by the customer, such as booking a flight or changing a password. A designer may then choose the sequences that, in the past, have more frequently led to successful outcomes.

In another embodiment of the present invention, instead of presenting suggestions for the system designer to choose from, the system may automatically choose the agent clusters and sequences according to the optimization criteria (e.g., based on the shortest interaction time).

In some embodiments of the present invention, the dialogue tree is automatically personalized based on characteristics of the customer. Customers interacting with a contact center can be very different from one another. For example, during interactions with a self-help system of a health care service, a 21 year old woman may typically have very different interests and concerns than that of a 75 year old man (e.g., 21 year old woman is likely less interested in geriatric services than the 75 year old man).

According to one embodiment of the present invention, a plurality of dialogue trees are generated, where each tree may be customized for particular types of customers. When the customer begins an interaction with the self-help system, the self-help system uses a set of features that are known about the customer and that are relevant to the personalization process (e.g., age, gender, location, previous interactions, owned products, and previously used services) to identify and assign the corresponding dialogue tree.

The set of features can be made available through an existing customer relationship management (CRM) system or by active input from the customer, or by automatically extracting this information from other metadata (e.g., geolocation services on the device used by the customer).

To generate the various customized dialogue trees, each recorded interaction is a assigned a set of personalization features based on known information about the customer involved in that interaction. The personalization features associated with the recorded interactions may be used during a pre-filtering stage to create several partitions of the recorded interactions, grouped by similar personalization features. From each partition (e.g., each group of subsets), a dialogue tree is mined, thereby generating multiple dialogue trees—one for each partition of the recorded interactions. For example, the recorded interactions may be partitioned by age and gender for customers under 18 years, 18-28 year old males, 18-28 year old females, 29-45 year old males, 29-45 year old females, 45-60 year old males, 45-60 year old females, etc. Geographic location may also be incorporated in a similar manner. At runtime (e.g., at the beginning of an interaction), the features identified for the current customer are used to select a dialogue tree suitable for the current customer's properties from the set of possible dialogue trees.

According to another embodiment of the present invention, the best route for a particular customer is chosen in real time (e.g., during the interaction) from a shared dialogue tree based on the personal features of the customer. This embodiment may be used in situations where there are insufficient recorded interactions to generate separate dialogue trees for each partition and therefore a dialogue tree is generated for multiple partitions (e.g., a dialogue tree is shared between different groups of customers). During an interaction, nodes of the shared dialogue tree are chosen in real time based on the customer's features. For example, referring back to FIG. 6, if the interaction is current at node $C_3$, and most successful interactions with customers having a profile similar to the current customer (e.g., male with an age in the range 18-28) proceed with agent path $A_6$, then agent response $A_6$ is automatically selected by the IMR 34 from among the possible agent nodes $A_5$, $A_6$, and $A_7$ that are connected to $C_3$. Generally, each agent node may be associated with a personalization feature vector (e.g., distributions of ages, distributions of genders, and distributions of locations) and the choice of the agent node for the current interaction is made by the IMR 34 by comparing features known about the current customer with the feature vectors associated with the agent nodes.

In some embodiments of the present invention, the features are compared in a particular order until a single agent node is identified. For example, the location maybe compared first, then gender, and then age. In other embodiments of the present invention, a current customer feature vector f is compared to cluster feature distributions c of each of the agent nodes to determine a distance between the features f of the current customer and mean feature vectors of each of the cluster feature distributions c and an agent node is selected based on the smallest distance.

As such, aspects of embodiments of the present can provide a system designer with suggestions on which of a set of options to use in a dialogue tree, based on information mined from previous recorded interactions, thereby reducing the degree to which the system designer must rely on assumptions or intuition alone.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 13A, FIG. 13B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 13A:
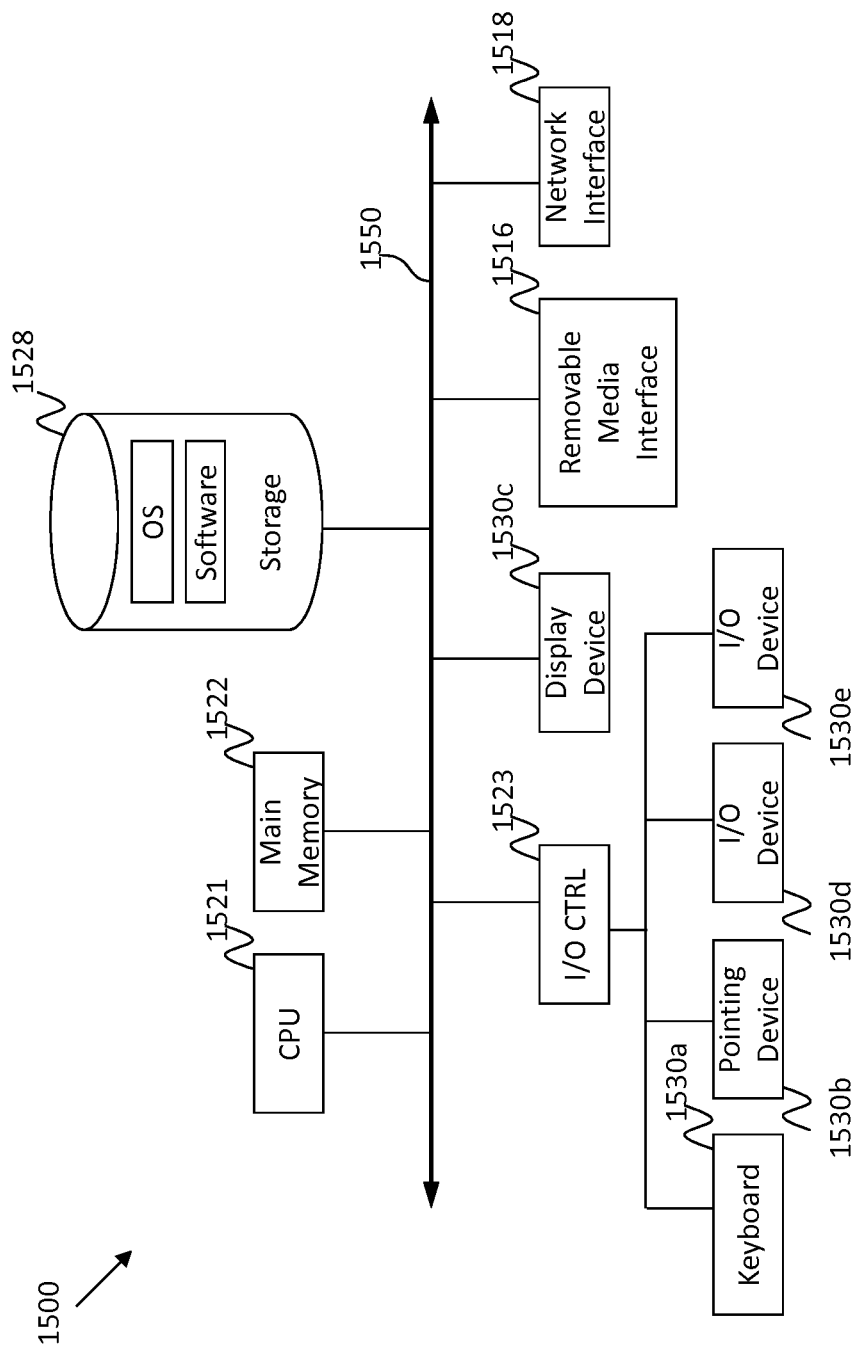
FIG. 13A is a block diagram of a computing device according to an embodiment of the present invention.
Figure 13B:
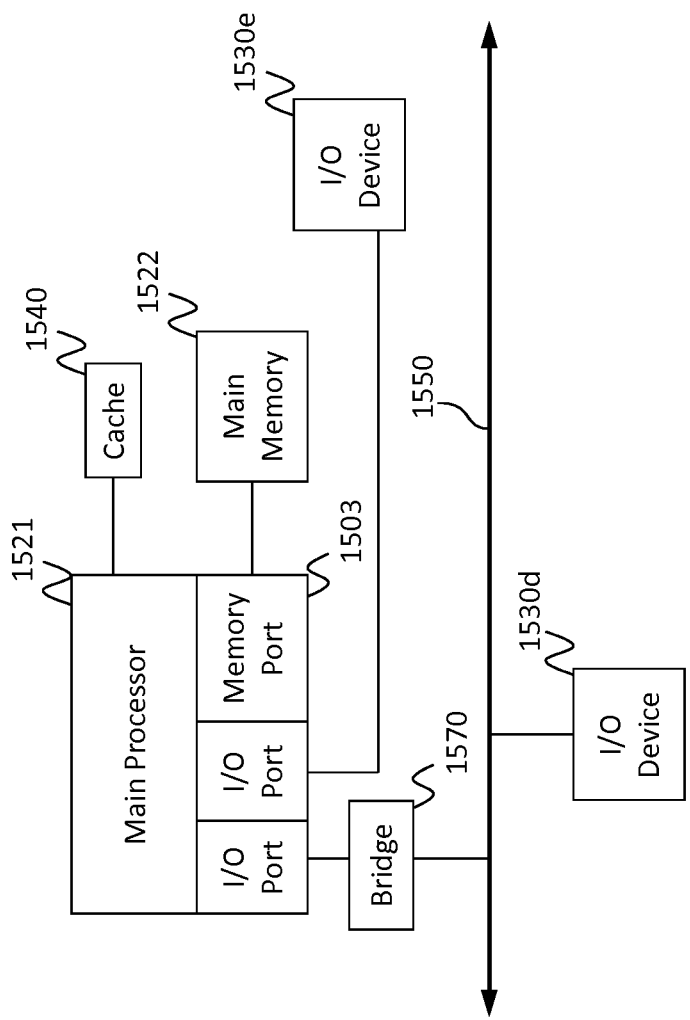
FIG. 13B is a block diagram of a computing device according to an embodiment of the present invention.

FIG. 13A-FIG. 13B depict block diagrams of a computing device 1500 as may be employed in exemplary embodiments of the present invention. Each computing device 1500 includes a central processing unit 1521 and a main memory unit 1522. As shown in FIG. 13A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 13B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 13A, the central processing unit 1521 communicates with the main memory 1522 via a system bus 1550. As shown in FIG. 13B, the central processing unit 1521 may also communicate directly with the main memory 1522 via a memory port 1503.

FIG. 13B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 13A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 13B depicts an embodiment of a computer 1500 in which the central processing unit 1521 communicates directly with I/O device 1530e. FIG. 13B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 13A, may control the I/O devices. The I/O controller may control one or more I/O devices such as a keyboard 1530a and a pointing device 1530b, e.g., a mouse or optical pen.

Referring again to FIG. 13A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect, or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 13A-FIG. 13B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

As shown in FIG. 13C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 13D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 13E:
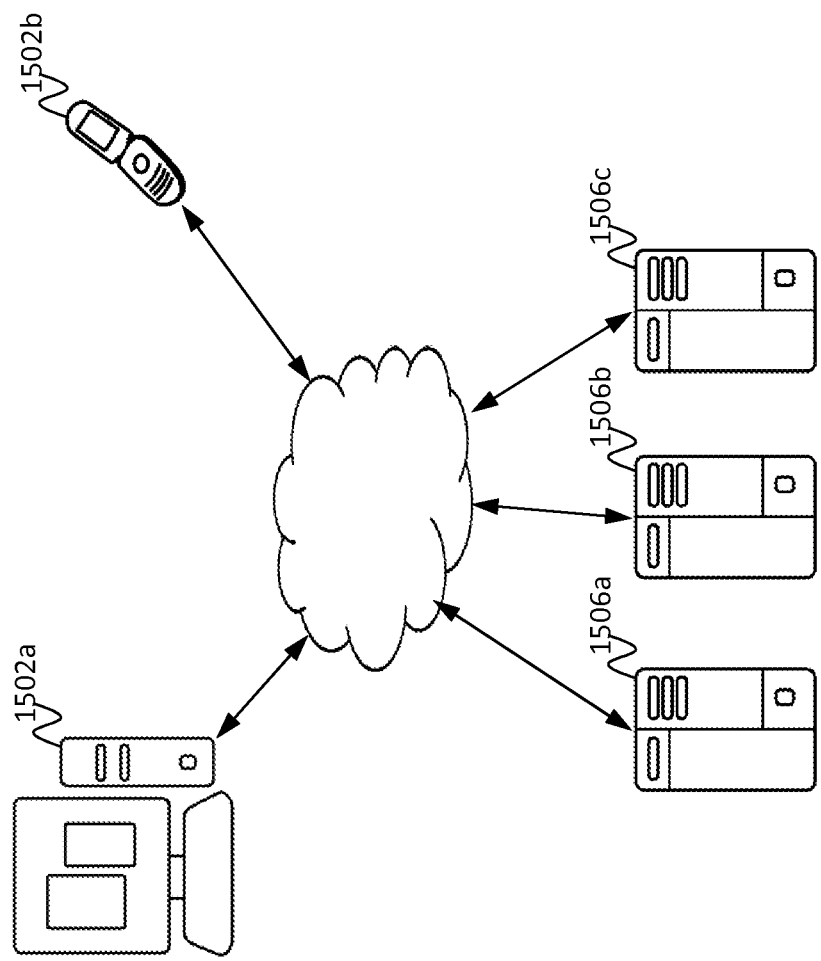
FIG. 13E is a block diagram of a network environment including several computing devices according to an embodiment of the present invention.

A computing device may be one of a plurality of machines connected by a network, or it may include a plurality of machines so connected. FIG. 13E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 13E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 13E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A method for operating an automated self-help system of a contact center, the automated self-help system comprising at least one dialogue tree, the method comprising:
   establishing, by a processor, an interaction between a customer and the automated self-help system;
   identifying, by the processor, a plurality of customer features of the customer, wherein the plurality of customer features are known about the customer and associated with previously recorded interactions of the customer;
   creating a plurality of partitions of the previously recorded interactions based on a plurality of groups of personalization features;
   mining a dialogue tree for sequences from each of the plurality of partitions to compute a at least one dialogue tree, wherein sequences are pruned to filter successful interactions and unsuccessful interactions;
   outputting the at least one dialogue tree for configuring the automated self-help system; and
   controlling the automated self-help system in accordance with the customer features and the at least one dialogue tree, wherein a warning is triggered upon selection of at least one dialogue tree comprising a bad sequence.

2. The method of claim 1, wherein the at least one dialogue tree comprises a plurality of dialogue trees, each of the dialogue trees being associated with a group of personalization features, and
   wherein the controlling the automated self-help system in accordance with the customer features further comprises identifying a dialogue tree of the dialogue trees associated with the group of personalization features corresponding to the customer features.

3. The method of claim 1, wherein the at least one dialogue tree comprises a plurality of agent nodes arranged in a plurality of agent layers and a plurality of customer nodes arranged in a plurality of customer layers,
   wherein at least one of the customer nodes is coupled to a plurality of successive agent nodes,
   wherein each edge of the edges between the at least one of the customer nodes and the successive agent nodes includes a condition corresponding to a group of personalization features, and
   wherein the controlling the automated self-help system in accordance with the customer features further comprises identifying an edge of the edges wherein the group of personalization features associated with the edge corresponds to the customer features.

4. A system comprising:
   a processor; and
   a memory, wherein the memory stores instructions that, when executed by the processor, cause the processor to:
   establish an interaction between a customer and an automated self-help system of a contact center, the automated self-help system comprising at least one dialogue tree;
   identify a plurality of customer features of the customer, wherein the plurality of customer features are known about the customer and associated with the previously recorded interactions of the customer;
   create a plurality of partitions of the previously recorded interactions based on a plurality of groups of personalization features;
   mine a dialogue tree for sequences from each of the plurality of partitions to compute a at least one dialogue tree, wherein sequences are pruned to filter successful interactions and unsuccessful interactions;
   output the at least one dialogue tree for configuring the automated self-help system; and
   control the automated self-help system in accordance with the customer features and the at least one dialogue tree, wherein a warning is triggered upon selection of at least one dialogue tree comprising a bad sequence.

5. The system of claim 4, wherein the at least one dialogue tree comprises a plurality of dialogue trees, each of the dialogue trees being associated with a group of personalization features, and
   wherein the instructions that cause the processor to control the automated self-help system in accordance with the customer features include instructions that, when executed by the processor, cause the processor to identify a dialogue tree of the dialogue trees associated with the group of personalization features corresponding to the customer features.

6. The system of claim 4, wherein the at least one dialogue tree comprises a plurality of agent nodes arranged in a plurality of agent layers and a plurality of customer nodes arranged in a plurality of customer layers,
   wherein at least one of the customer nodes is coupled to a plurality of successive agent nodes,
   wherein each edge of the edges between the at least one of the customer nodes and the successive agent nodes includes a condition corresponding to a group of personalization features, and
   wherein the instructions that cause the processor to control the automated self-help system in accordance with the customer features include instructions that, when executed by the processor, cause the processor to identify an edge of the edges wherein the group of personalization features associated with the edge corresponds to the customer features.

7. The method of claim 1, wherein the successful interaction comprises one or more of: interactions did not follow with a repeat interaction after a given period of time, sentiment analysis of positive emotion, and explicit indications from the customer.

8. The method of claim 1, wherein the unsuccessful interaction comprises one or more of: sentiment analysis of negative emotion and an escalation request.

9. The system of claim 4, wherein the successful interaction comprises one or more of: interactions did not follow with a repeat interaction after a given period of time, sentiment analysis of positive emotion, and explicit indications from the customer.

10. The system of claim 4, wherein the unsuccessful interaction comprises one or more of: sentiment analysis of negative emotion and an escalation request.

* * * * *